(12) United States Patent
Balzer et al.

(10) Patent No.: US 10,501,166 B2
(45) Date of Patent: Dec. 10, 2019

(54) METHODS AND APPARATUS TO CONTROL A GAP BETWEEN MOVABLE AIRCRAFT WING COMPONENTS

(71) Applicant: The Boeing Company, Chicago, IL (US)

(72) Inventors: Michael A. Balzer, Kirkland, WA (US); Jan A. Kordel, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 414 days.

(21) Appl. No.: 15/628,311

(22) Filed: Jun. 20, 2017

(65) Prior Publication Data

US 2017/0283034 A1    Oct. 5, 2017

Related U.S. Application Data

(63) Continuation-in-part of application No. 13/623,597, filed on Sep. 20, 2012, now Pat. No. 9,688,384.

(51) Int. Cl.
*B64C 7/00* (2006.01)
*B64C 3/50* (2006.01)
*B64C 9/16* (2006.01)
*B64C 9/02* (2006.01)

(52) U.S. Cl.
CPC .................. *B64C 3/50* (2013.01); *B64C 7/00* (2013.01); *B64C 9/02* (2013.01); *B64C 9/16* (2013.01)

(58) Field of Classification Search
CPC .... B64C 7/00; B64C 3/50; B64C 9/16; B64C 9/02
See application file for complete search history.

(56) References Cited

U.S. PATENT DOCUMENTS

| 2,261,363 A | 11/1941 | Griswold |
| 2,329,177 A | 9/1943 | Baker |
| 2,406,919 A | 9/1946 | Stalker |
| 2,444,293 A | 6/1948 | Holt |
| 3,371,888 A | 3/1968 | Alvarez-Calderon |
| 3,447,761 A | 6/1969 | Whitener et al. |
| 3,987,983 A | 10/1976 | Cole |
| 4,381,093 A | 4/1983 | Rudolph |
| 4,434,959 A | 3/1984 | Rudolph |
| 4,712,752 A | 12/1987 | Victor |
| 4,720,066 A | 1/1988 | Renken et al. |

(Continued)

OTHER PUBLICATIONS

United States Patent and Trademark Office, "Non-final Office Action," issued in connection with U.S. Appl. No. 13/623,597, dated Apr. 9, 2015, 11 pages.

(Continued)

*Primary Examiner* — Richard R. Green
(74) *Attorney, Agent, or Firm* — Hanley Flight & Zimmerman, LLC

(57) ABSTRACT

Methods and apparatus to control a gap between movable aircraft wing components are disclosed. An example apparatus includes spoiler including a first panel and a second panel, a flexible tip extending from an intersection of the first and second panels; and a rub block coupled to a surface of the second panel, the rub block positioned to engage a flap to maintain a distance between the spoiler and the flap and to enable the flexible tip to perform deform to change aerodynamic properties of the spoiler.

20 Claims, 24 Drawing Sheets

(56) References Cited

U.S. PATENT DOCUMENTS

| | | | |
|---|---|---|---|
| 4,725,026 A * | 2/1988 | Krafka | B64C 9/16 244/213 |
| 4,784,355 A | 11/1988 | Brine | |
| RE32,907 E | 4/1989 | Rudolph | |
| 5,178,348 A | 1/1993 | Bliesner | |
| 5,224,670 A | 7/1993 | Padden | |
| 6,299,109 B1 | 10/2001 | Stephan et al. | |
| 6,655,635 B2 | 12/2003 | Maury et al. | |
| 7,051,982 B1 | 5/2006 | Johnson | |
| 7,322,547 B2 | 1/2008 | Konings | |
| 7,611,099 B2 | 11/2009 | Kordel et al. | |
| 7,708,231 B2 | 5/2010 | Lacy et al. | |
| 8,651,428 B2 * | 2/2014 | Parker | B64C 9/16 244/213 |
| 9,038,964 B2 | 5/2015 | Wildman | |
| 9,688,384 B1 | 6/2017 | Balzer et al. | |
| 2003/0006344 A1 | 1/2003 | Pauly | |
| 2005/0061922 A1 | 5/2005 | Milliere | |
| 2006/0145012 A1 | 7/2006 | Hernandez | |
| 2006/0145013 A1 | 7/2006 | Gomez | |
| 2010/0288887 A1 | 11/2010 | Parker | |
| 2010/0327121 A1 | 12/2010 | McAlinden et al. | |
| 2011/0031349 A1 | 2/2011 | Wildman et al. | |
| 2011/0174933 A1 | 7/2011 | Blades | |
| 2011/0186690 A1 | 8/2011 | Stewart | |
| 2011/0272532 A1 | 11/2011 | Matsuda | |
| 2012/0234983 A1 | 9/2012 | Wildman | |

OTHER PUBLICATIONS

United States Patent and Trademark Office, "Final Office Action," issued in connection with U.S. Appl. No. 13/623,597, dated Oct. 26, 2015, 11 pages.

United States Patent and Trademark Office, "Non-final Office Action," issued in connection with U.S. Appl. No. 13/623,597, dated Apr. 8, 2016, 2015, 13 pages.

United States Patent and Trademark Office, "Final Office Action," issued in connection with U.S. Appl. No. 13/623,597, dated Nov. 4, 2016, 16 pages.

United States Patent and Trademark Office, "Notice of Allowance," issued in connection with U.S. Appl. No. 13/623,597, dated Mar. 1, 2017, 15 pages.

* cited by examiner

METHODS AND APPARATUS TO CONTROL A GAP BETWEEN MOVABLE AIRCRAFT WING COMPONENTS

RELATED APPLICATION

This patent is a continuation-in-part of U.S. patent application Ser. No. 13/623,597, filed Sep. 20, 2012. U.S. patent application Ser. No. 13/623,597 is hereby incorporated herein by reference in its entirety. Priority is claimed to U.S. patent application Ser. No. 13/623,597.

FIELD OF THE DISCLOSURE

This patent relates to aircraft wing components and, more specifically, to methods and apparatus to control a gap between movable aircraft wing components.

BACKGROUND

Spoilers may be used in aircraft for ground braking, roll control and/or reducing the speed of an aircraft in flight. Drooping spoilers, which are movable (e.g., move up and/or down) relative to flaps, may be used to enable smooth airflow over the respective wings. However, to substantially reduce contact loads between the spoilers and the flaps that may result from the movability of the spoiler, costly, complex and heavy linkage is used to control the movement of the spoilers.

SUMMARY

An example apparatus includes a spoiler including a first panel and a second panel, a flexible tip extending from an intersection of the first and second panels; and a rub block coupled to a surface of the second panel, the rub block positioned to engage a flap to maintain a distance between the spoiler and the flap and to enable the flexible tip to perform a variable camber operation in which the flexible tip deforms to change aerodynamic properties of the spoiler.

DETAILED DESCRIPTION

Figure 1:
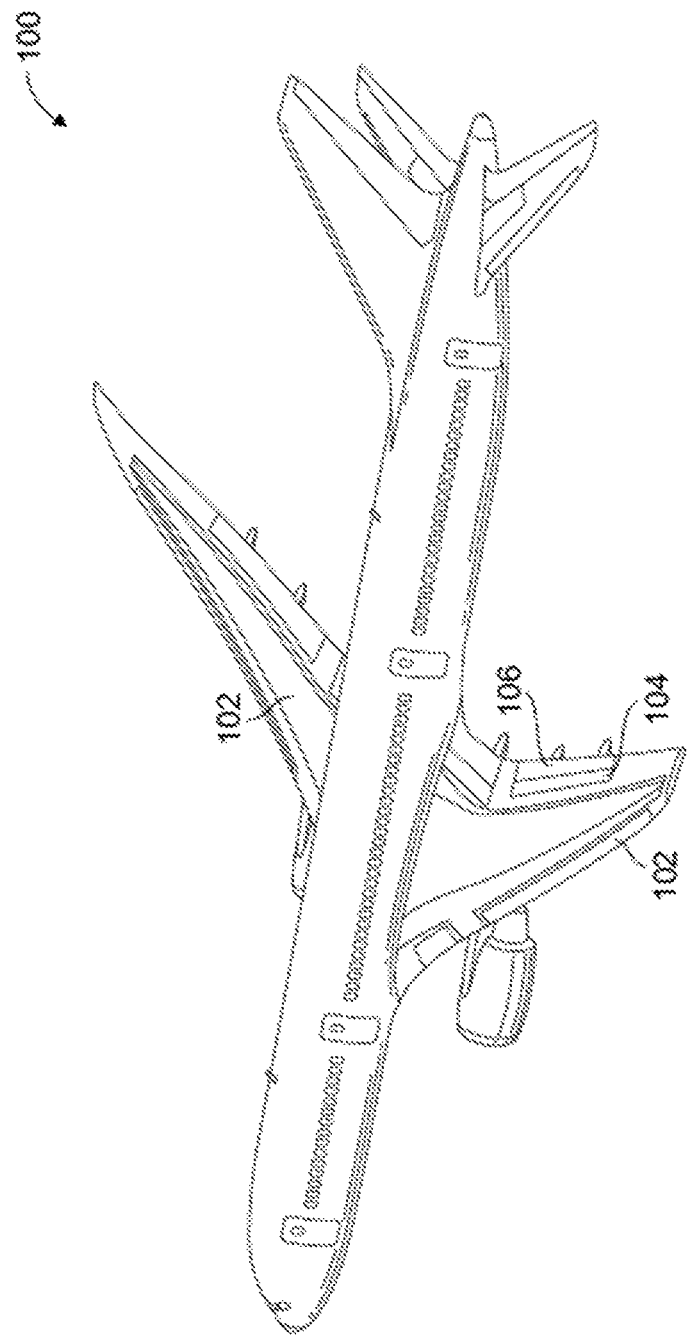
FIG. 1 depicts an example aircraft in which the examples disclosed herein can be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to methods and apparatus for controlling a gap and/or distance between a spoiler and a flap of an aircraft (e.g., large transport aircraft). By controlling the distance between the spoiler and the flap in, for example, a cruise configuration, a relatively low contact force seal is substantially ensured between the spoiler and the flap. In some examples, to increase manufacturing tolerances between the angular position of the spoiler and the flap and to reduce the number of parts and/or cost while maintaining and/or increasing the performance of the spoiler and/or the flap, there are two spaced-apart contact areas and/or points between the spoiler and the flap.

Using the examples disclosed herein, the tip and/or the end of the spoiler may be precisely positioned relative to the flap to substantially prevent a gap between the spoiler and the flap and/or excessive contact loads between the spoiler and the flap. The occurrence of gaps and/or excessive contact loads between the spoiler and the flap may increase with aircraft having drooping spoilers in which, in the cruise configuration, the spoiler is in an intermediate command actuator position. In some examples, drooping spoilers are spoilers that move downward with the flap to substantially ensure smooth airflow over the wing.

In contrast to the examples disclosed herein, non-drooping spoilers have adjustable hard stops that are engaged when the spoiler is in the cruise configuration to prevent the spoiler from drooping and/or applying excessive contact loads between the spoiler and the flap. In contrast to the examples disclosed herein, some drooping spoilers require costly, complex and relatively heavy linkage to enable the spoiler to droop and/or move downward with the flap.

In some examples, to monitor the spoiler to flap contact loads and/or to increase the positional accuracy of the spoiler and/or the flap, sensors may be used to determine the spoiler angle. However, such sensors may be costly to obtain and/or install and may require maintenance. To decrease contact loads, wear surfaces, shims and/or rub strips may be installed on the flaps. However, such wear surfaces and/or rub strips may be relatively heavy, require maintenance and/or incur an aerodynamic penalty.

The examples disclosed herein maintain a distance between a spoiler and a flap using an example rub block positioned, integrated with and/or coupled to an underside of the spoiler panel. The rub block may be sized, shaped and/or positioned to contact the flap in the cruise configuration to enable trailing edge variable camber operation. In some examples, trailing edge variable camber operation is associated with changing the camber of the wing by incrementally adjusting the flap (e.g., 0.5° adjustments) in flight. The flap may be adjusted upwards or downwards from the nominal cruise position based on weight changes of the aircraft due to, for example, fuel consumption.

In some examples, the rub block is sized and/or shaped to react spoiler to flap contact forces during a failure condition in which the flap retracts into and forcibly raises the spoiler and/or when the spoiler drives downward into the flap. To distribute the load and/or increase load capabilities, the rub block may have a relatively large spanwise width. In some examples, the rub block spans the entire width of the spoiler. In some examples, the rub block is shaped and/or configured to enable the load to be distributed evenly to the contacting flap. Aft and/or behind the rub block, the spoiler may include an integral, relatively thin and flexible spoiler tip. In some examples, the spoiler tip may be sized to substantially ensure a particular contact load when the rub block contacts the flap. To substantially reduce local deflection, larger contact loads between the spoiler and the flap may be reacted in a location where the spoiler body is relatively stiffer using one or more wear pads located on an underside of the spoiler and/or adjacent the spoiler tip.

In operation, when contact occurs between the spoiler and the flap, the flexible tip of the spoiler deforms into an aerodynamic shape (e.g., an ideal aerodynamic shape). The limited contact load between the spoiler and the flap enables the spoiler to have a relatively thin trailing edge that substantially improves aerodynamic performance. By providing a first contact point and/or area adjacent the trailing edge and a second contact point and/or area forward of the trailing edge, the allowable total combined contact load may be increased. In some examples, the forward contact point, area and/or rub block may be able to receive a larger contact load based on its material, contact surface, etc. For example, the rub block may have relatively high wear resistance characteristics and may be made of composite, polymer, Polyoxymethylene, Delrin, Phenolic, etc. Based on the increased allowable contact load, a larger chord spoiler may be used for a given sensor arrangement and/or the supplemental sensor arrangement (e.g., sensors external of the actuators) may not be used. Removing supplemental sensors arrangements decreases the cost and/or weight of the aircraft.

In some examples, the example spoilers disclosed herein include carbon composite sandwich structures and/or metal that are structured and/or configured to manage a gap between a spoiler (e.g., a drooping spoiler) and a flap and/or to manage spoiler scrubbing chordwise along an underside of the spoiler and against the flap upper surface. The examples disclosed herein enable a tip of a spoiler to engage and/or to be positioned relative to a flap surface and/or to maintain contact loads at the tip to be below a threshold.

In examples in which the spoilers are metallic, the example spoilers may be machined from a single piece of metal. Aluminum may be used to produce the spoilers. However, any other metal may be used. When producing some example spoilers, an exterior surface (e.g., an upper surface) of the metal is machined to correspond to a contour of the wing and/or an inner surface of the metal is machined into a web of stiffeners. Additionally or alternatively, when producing some example spoilers, the spoilers may be formed by bonding metal layers to form a sandwich construction and/or layered assembly.

In some examples, to control a gap and/or distance between a spoiler and a flap of an aircraft, the spoiler includes a rub block structured to contact the flap during different conditions. The example rub blocks disclosed herein may have a bulbous shape that is structured and/or configured to engage a flap in different configurations. To couple the rub block(s) to the spoiler, in some example, the rub block has a contour corresponding to the underside of the spoiler. In other words, the example rub blocks disclosed herein may be a supplemental and/or additional structure that is coupled to the underside of the spoiler to provide a gap between the spoiler and the flap when the spoiler and flap engage. Without this gap being provided and/or without the contact loads between the spoiler and the flap being maintained under a threshold, in some examples, trailing edge variable camber operation of the tip of the spoiler may not be usable, drag may be increased, cruise performance may be reduced and/or the flap and/or the spoiler may be damaged and/or endure increased wear and/or a reduced life cycle.

In some examples, the rub block spans a majority of the spoiler. However, to decrease the weight and/or cost of the rub block and/or to decrease the aerodynamic penalty of including such a rub block(s) on the underside of the spoiler, in other examples, a plurality of rub blocks intermittently coupled to the underside of the spoiler may be used. In examples when a plurality of rub blocks are used, the rub blocks may be similarly or differently sized.

In examples in which the rub blocks are differently sized, a first size rub block may be coupled adjacent an actuator and/or actuator linkage and second size rub blocks may be coupled at inboard and/or outboard ends of the spoiler. In some examples, the first size rub block is larger and/or differently shaped than the second size rub blocks. In other words, in some examples, the rub block is not continuous in a spanwise direction.

When the example spoiler is a metal bonded spoiler, in some examples, an upper skin and/or panel of the spoiler extends beyond a joint between the upper and lower skins and/or panels to form a thin, flexible TE tip. Thus, unlike spoilers that include a carbon tip in which the lower and upper panels join to form an aft extending laminate, in some example metal bonded spoilers, the lower panel terminates at a bondline forward of the spoiler tip formed by the upper panel. In some examples, the joint between the upper and lower panels is a bonded joint with or without additional fasteners. In an example in which an additional fastener(s) is used to couple the upper and lower panels, the fastener(s) may be counter sunk on the upper surface and/or include a protruding head on the lower surface. While the above example mentions the lower panel terminating forward of the spoiler tip, the lower panel may terminate at any other location including, for example, an end of the spoiler tip itself. Regardless of where the end of the lower panel terminates, in some flap configurations, the example rub blocks react backdrive conditions where the upper panel flexes up and away from the flap and the thicker, bonded and/or fastened region of the upper and lower panels acts as a contact point and/or area for backdrive load. As set forth herein, backdrive refers to a failure condition in which the flap raises into and moves the spoiler. In some examples, metal bonded spoilers are used in configurations having lower fowler in which the overlap between the flap and the spoiler is reduced.

In flap configurations having higher fowler in which the overlap between the flap and the spoiler is greater, the example rub blocks may be structured to manage and/or enable such a configuration between the flap and the spoiler that reduces an area of the wing. In flap configurations having higher fowler in which the overlap between the flap and the spoiler is greater, the example rub blocks may be structured to manage spoiler location tolerances and/or to manage flap to spoiler contact conditions during at least some backdrive events. Employing higher fowler flap configurations enable relatively large wing area reduction that enhances aircraft performance and the examples disclosed herein enable a gap between the spoiler and the flap to be controlled to enable such higher fowler flap configurations.

In some examples, the rub block is coupled to the underside of the spoiler and can be common to and/or end at the trailing edge of the spoiler body tip and/or can be common to and/or end at the trailing edge of the lower panel of the spoiler. In some examples, the rub block is coupled to the underside of the spoiler and can be forward of the trailing edge of the spoiler body tip and/or can be forward of the trailing edge of the lower panel of the spoiler. In some examples, the rub block is coupled to the underside of the spoiler and can be aft of the trailing edge of the upper and/or lower panels and/or can be aft of the trailing edge of the lower panel of the spoiler. Regardless of the coupling of the rub block on the underside of the example spoilers, the example rub blocks are structured and/or configured to maintain a gap between the spoiler and the flap in a backdrive configuration and/or are structured and/or configured to enable trailing edge variable camber operation of the tip of the spoiler and/or enables commanded spoiler actuation tolerances and/or substantially ensures flap to spoiler sealing during all spoiler and/or flap engagement configurations and/or cruise and/or high-speed flight configurations, etc. In some examples, the example rub blocks disclosed herein enable a spoiler position to be biased such that a nominal position of the spoiler engages the flap with a relatively low amount of force (e.g., just touching) and/or enables tolerances that push the spoiler further into the flap to be relatively absorbed by the flap, thereby reducing a true-range of motion of the tip of the spoiler.

In some examples including metal bonded spoiler configurations, a flexible conformal trailing edge (CTE) may be included that is made of a composite material(s) such as, for example fiberglass reinforced plastic (GFRP) and/or fiber reinforced plastic (CFRP). In some such examples, the spoilers include a rub block integrated with the spoiler flexible tip where the rub block is manufactured using plies of material such as, for example, GFRP and/or CFRP. In some examples, the rub block is separately bonded and/or coupled to the underside of the spoiler to enable the rub block to be installed on the spoiler over a partial span of the spoiler.

In some flap configurations having higher fowler, an interface between the lower surface(s) of the spoiler and an upper surface(s) of the flap interact and/or rub and/or scrub against one another during a backdrive event moving a contact point and/or area between the spoiler and the flap forward and/or forward of the rub block. In some examples, as the contact point moves forward, the contact load increases because the backdrive load is reacting a relatively constant hinge moment from an actuator used to move the spoiler. To mitigate the increased contact load, in some examples, the rub block is extended forward along the lower surface of the spoiler. Because the flap to spoiler contact loads of the spoiler may be concentrated along the center of the spoiler, in some examples, the example rub block is extended in a region aft of the actuator of the spoiler and/or the rub block is extended forward in regions where contact between the spoiler and the flap may occur. To enable higher local compression loads to be reacted, in some examples, the spoiler includes a relatively high-density core and/or frame. The high-density core may include a honeycomb structure and/or ribs that are structured and/or configured to react flap to spoiler contact directly.

FIG. 1 illustrates an example aircraft 100 having wings 102 in accordance with the teachings of this disclosure. In some examples, the wings 102 include drooping spoilers 104 that are movable (e.g., move up and/or down) with flaps 106 to substantially ensure smooth airflow over the respective wings 102.

Figure 2:
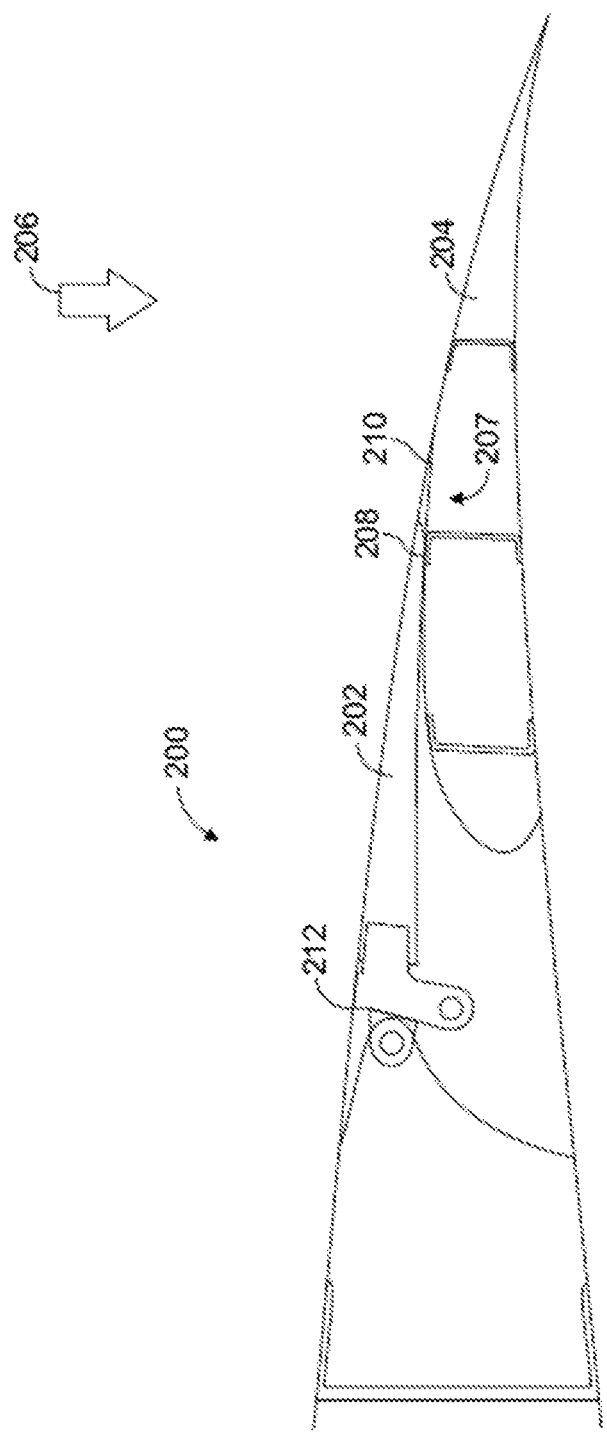
FIG. 2 depicts a portion of an example wing that can be used to implement the wings of the example aircraft of FIG. 1.
Figure 3:
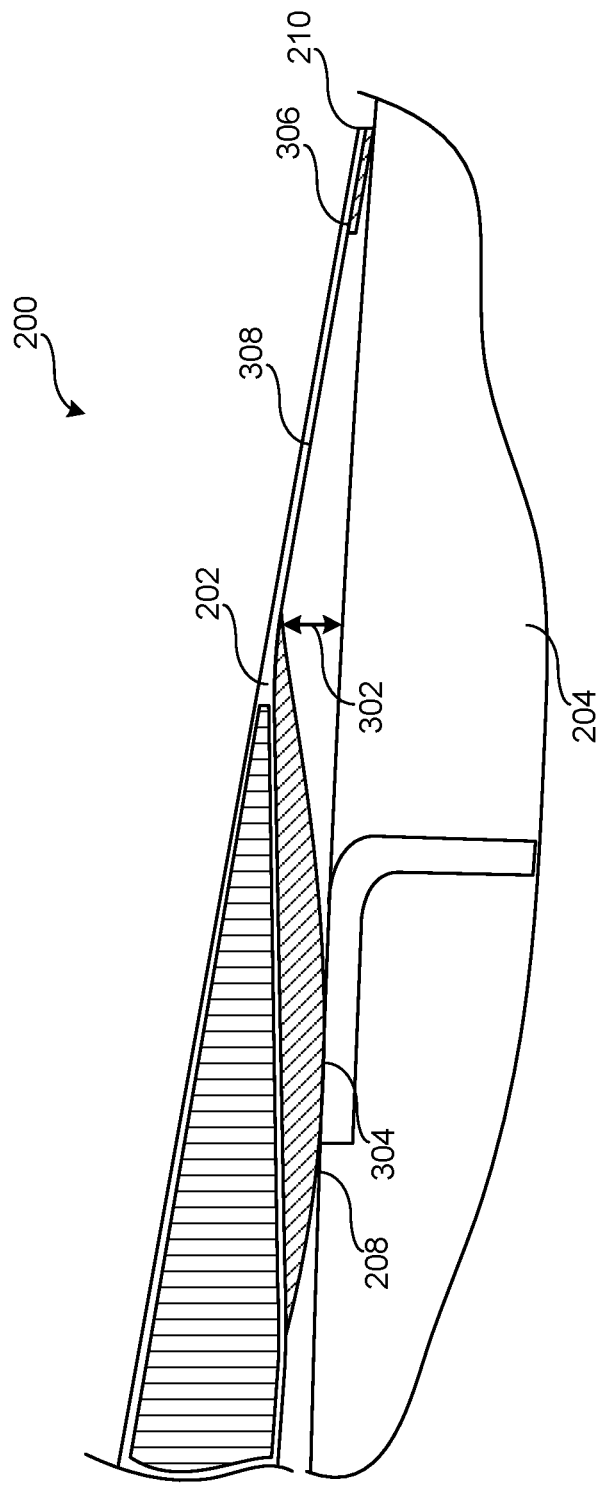
FIGS. 3-7 depict different positions of an example spoiler having an example rub block and an example flap that can be used to implement the examples disclosed herein.

FIGS. 2 and 3 depict a portion of an example aircraft wing 200 in accordance with the teaching of this disclosure. The wing 200 includes an example spoiler 202 and a flap 204. In this example, the spoiler 202 is a drooping spoiler that can move in a direction generally indicated by arrow 206 to enable smooth airflow over the wing 200 regardless of the wing configuration (e.g., a cruising configuration), flap configuration etc. For example, the spoiler 202 can generally move in the direction of and/or opposite the direction of the arrow 206 if the wing 200 is used on an aircraft (e.g., the aircraft 100) having trailing edge variable camber operation. In such examples, the flap 204 may rotate upwards a small amount (e.g., 1 or 2 degrees). To maintain a seal at an interface point 207, the spoiler 202 may rotate upwards to substantially match the motion of the flap 204.

In other examples, to create drag and/or a downward force on the wing 200, the spoiler 202 is rotated in a direction opposite the direction of the arrow 206. In such examples, because the spoiler 202 is rotated to create drag and/or a downward force on the wing 200, sealing engagement between the spoiler 202 and the flap 204 is not maintained (e.g., at a leading edge 210 or a trailing edge 212 of the spoiler 202 and the flap 204).

To enable the spoiler 202 to engage the flap 204 at multiple points and to control the position of the spoiler 202, the spoiler 202 includes a structure and/or rub block 208 positioned between the trailing edge 210 and the leading edge 212 of the spoiler 202. In a cruise configuration, as shown in FIGS. 2 and 3, a first surface 304 of the rub block 208 engages the flap 204 and substantially maintains a gap and/or distance 302 (FIG. 3) between the spoiler 202 and the flap 204. The rub block 208 may be made of any suitable material(s) that is a wear resistant low friction material and/or bondable to the main body of the spoiler 202. Some materials that the rub block 208 may made of include delrin and/or phenolic. The wear resistance properties substantially prevent the rub block 208 from wearing away under contact with the flap 204. The low friction properties also substantially minimize the wear that the rub block 208 imparts to the flap 204.

In some examples, main panels of the spoiler 202 are made from BMS 8-256 preimpregnated carbon fabric sandwich construction (e.g., the 787 for Boeing, the 777 for Boeing) or metalbond sandwich construction (e.g., the 737NG for Boeing). In some examples, the lower surface of the BMS 8-256 spoiler is finished with a ply tedlar. In some examples, a tip of the spoiler 202 adjacent the trailing edge 210 (e.g., 787 for Boeing) is made from a thin BMS 8-256 laminate that is finished with enamel paint. In some examples, the tip of the spoiler 202 is made from thin carbon laminates, thin fiberglass laminates and/or hybrid laminates of fiberglass and carbon based upon the competing requirements for flexibility and stiffness.

In some examples, upper skins of the flap 204 are made from BMS 8-256 preimpregnated carbon fabric sandwich construction (e.g., the 777 for Boeing) and/or HMS9-001 resin infusion laminated carbon fabric panels (e.g., the 787 for Boeing). In some examples, the flap 204 is finished with enamel paint and further protected by Teflon® paint at contact wear areas with the spoiler 202 to provide additional protection.

In some examples, the spoiler 202 only contacts the flap 204 in a cruise position (e.g., including trailing edge variable camber operation), or sealed take-off positions for low flap angles (e.g., generally less than 10 degrees). During normal cruise operation, the rub block 208 on the spoiler 202 contacts the flap 204 with a force that is significantly less than the capability of the spoiler 202 if the spoiler were in a different position and/or configuration. In other words, during normal cruise operation, the rub block 208 engages the flap 204 with a relatively low force as compared to, for example, a backdrive configuration.

In some examples, the shape of the rub block 208 accounts for the variability of the exact contact position between the spoiler 202 and flap 204. The relatively broad contact area provided by the rub block 208 substantially ensures consistent sealing through trailing edge variable camber and sealed take-off positions without excessive wear on the flap 204. The relatively broad contact area provided by the rub block 208 enables the required accuracy of the spoiler position system to be reduced, thereby reducing the cost and the weight of such systems.

In some examples, to reduce an amount of wear of the trailing edge 210 or flap 204, one or more rub strips, shims and/or wear pads 306 may be coupled to an underside surface 308 of the spoiler 202. The wear pads 306 may be made of any suitable material such as Delrin.

As shown in FIG. 3, the compliant trailing edge 210 may engage the flap 204 and/or may be deflected slightly during normal operation and/or in the cruise position. The slight deflection of the trailing edge 210 in the normal cruise position, shown in FIG. 3, enables sealing at slightly different flap cruise positions (e.g., during trailing edge variable camber) and enables the contact loads between the spoiler 202 and the flap 204 to be distributed between two points, thereby reducing contact stress and/or wear between the flap 204 and the spoiler 202. The slight deflection of the trailing edge 210 enables aerodynamic fair between the spoiler 202 and the flap 204. In some examples, because the trailing edge 210 is relatively thin relative to the tip of the spoiler 202, an aft facing step is smaller and produces less aerodynamic drag.

Figure 4:
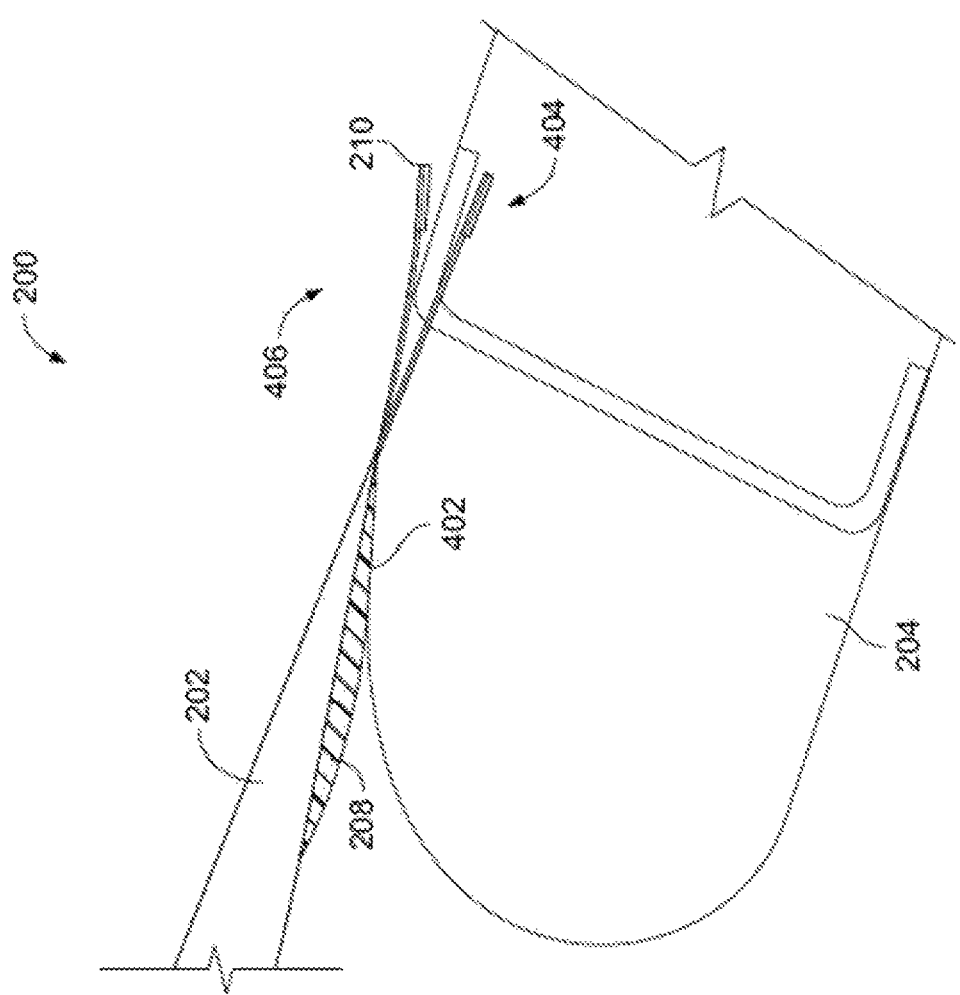

As shown in FIG. 4, during a failure condition in which the spoiler 202 lowers into the flap 204 (e.g., spoiler hardover) and/or the flap 204 raises into and moves the spoiler 202 (e.g., backdrive), a second surface 402 of the rub block 208 engages the flap 204 to substantially ensure that the trailing edge 210 is not damaged. As shown in FIG. 4, the trailing edge 210 may be relatively thin (e.g., four plies) and may flex relative to the flap 204 without damage from a first and/or non-flexed position 404 to a second and/or flexed position 406 to enable the spoiler 202 to not be damaged when the spoiler 202 engages the flap 204 in a failure condition, for example. During spoiler hardover or backdrive failure scenarios, the tip of the spoiler 202 may flex upwards under the large contact loads of the flap 204 without failure (See FIG. 4). In such failure scenarios, all or nearly all of the contact load between flap 204 and the spoiler 202 occurs between the rub block 208 and the flap 204.

During spoiler hardover/backdrive failure conditions, the rub block 208 may react the full spoiler actuator capability. Additionally, during spoiler hardover/backdrive failure conditions, the contact between the rub block 208 and the flap 204 may be at different angles/positions than the contact that occurs during normal operation. For example, during normal operation, all flap 204 to spoiler 202 contact occurs with the flap 204 at zero degrees down (e.g., +/− one or two degrees for trailing edge variable camber). In contrast, during spoiler hardover/backdrive, the flap 204 to spoiler 202 contact may occur at any angle of the flap 204 from zero degrees down to full spoiler 202 down (e.g., the spoiler 202 at approximately 11 degrees, the flap 204 at approximately 25 degrees). Therefore, the spoiler 202 to flap 204 contact may be on the aft face of the rub block 208, as shown in FIG. 4, instead of on the bottom surface of the rub block 208, as shown in FIG. 3. To assist in managing the contact between the flap 204 and the spoiler 202, the rub block 208 may be extended aft with a specific profile depending upon the interface angles.

A spoiler hardover may occur when the spoiler 202 is driven downwards into relatively hard contact with the flap 204 (e.g., equivalent to full spoiler actuator capability). In some examples, a spoiler hardover occurs during a system failure (e.g., not during normal operation) where a spoiler down command is given when the flap 204 is in an up position.

A backdrive (e.g., when the flap 204 moves upwards into the spoiler 202) may occur during a system failure (e.g., not during normal operation). In some examples, a backdrive occurs when the flap 204 is driven upwards into relatively hard contact with the spoiler 202 (e.g., against full spoiler actuator capability). During hardover, because the actuators of the flap 204 are stronger than the actuators of the spoiler 202, the flap 204 contacts the spoiler 202 and physically pushes the spoiler 202 back (e.g., upwards) until the flap 204 stops moving.

Figure 5:
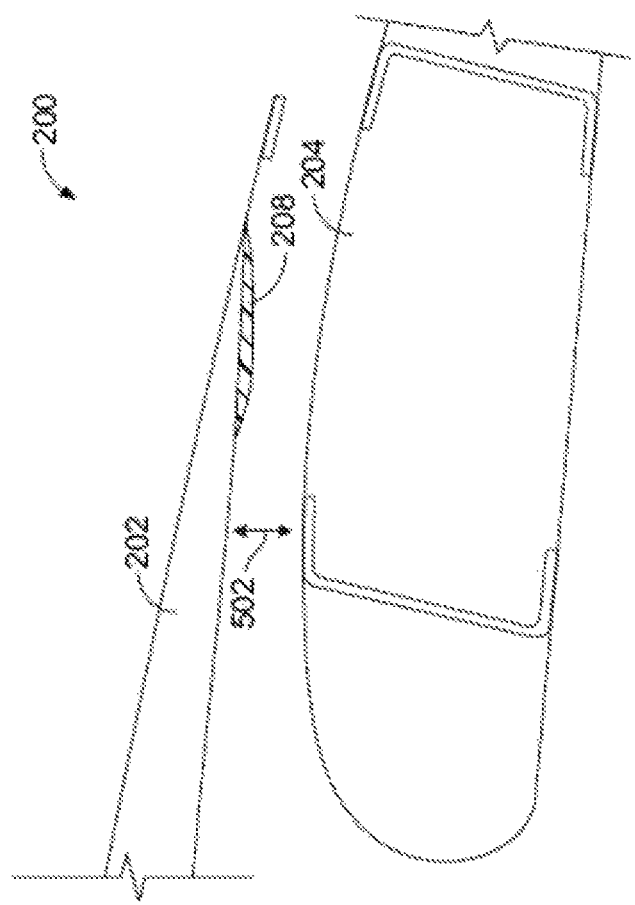

FIG. 5 depicts the wing 200 in a potential take-off configuration in which the spoiler 202 and/or the flap 204 are lowered five degrees relative to, for example, the cruise configuration. In some examples, such as in the take-off configuration and/or the landing configuration, the rub block 208 does not contact the flap 204 when the spoiler 202 is rotated further down because a gap 502 is required between the flap 204 and spoiler 202 for these positions.

Figure 6:
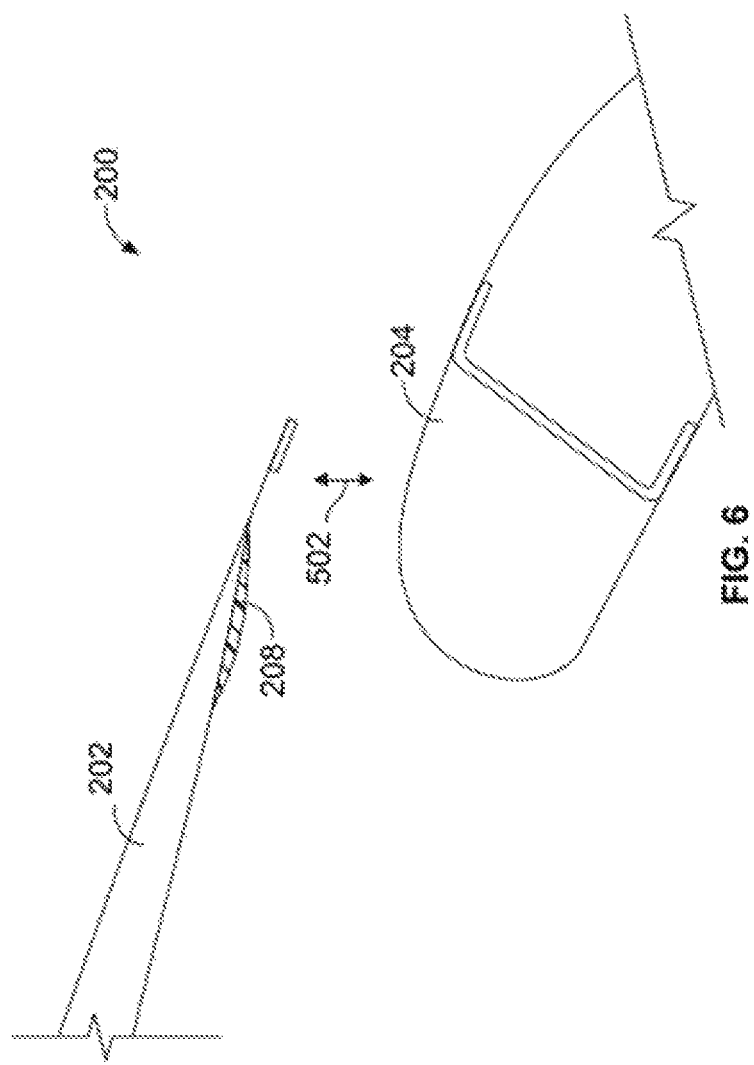

FIG. 6 depicts the wing 200 in a potential landing configuration in which the flap 204 is lowered up to 30 degrees relative to, for example, the cruise configuration. In some examples, the rub block 208 has a contour to enable smooth airflow between the spoiler 202 and the flap 204 in the take-off and/or the landing configurations.

The positioning of the flap 204 and/or the spoiler 202 at takeoff and landing is dictated by low speed aerodynamics specialists and varies between aircraft. For aircraft with drooping spoilers (e.g., the 787 for Boeing), from the cruise position, the flap 204 and the spoiler 202 both rotate downwards for takeoff and landing positions. As the flap 204 rotates downwards, the spoiler 202 follows, but at a slower rate to enable the gap 502 to develop between the tip of the spoiler 202 and the body of the flap 204. This is beneficial for aerodynamic performance of the wing 200 during takeoff and/or landing, for example. A width of the gap 502 may increase as the flap 204 moves downwards. The rotation of the flap 204 also carries the flap 204 aft relative to the tip of the spoiler 202 and reduces the overlap between the devices.

In some examples, the difference between landing and takeoff positions is associated with the rotational angle of the flap 204. The rotational angle of the flap 204 during takeoff may be a lesser angle (e.g., 10-20 degrees) while the rotational angle of the flap 204 during landing may be a greater angle (e.g., 30-40 degrees). The landing position provides the greatest lift, enabling lower aircraft landing speeds, but at the cost of greater drag. The takeoff position provides relatively less lift than landing position, but with less drag.

Figure 7:
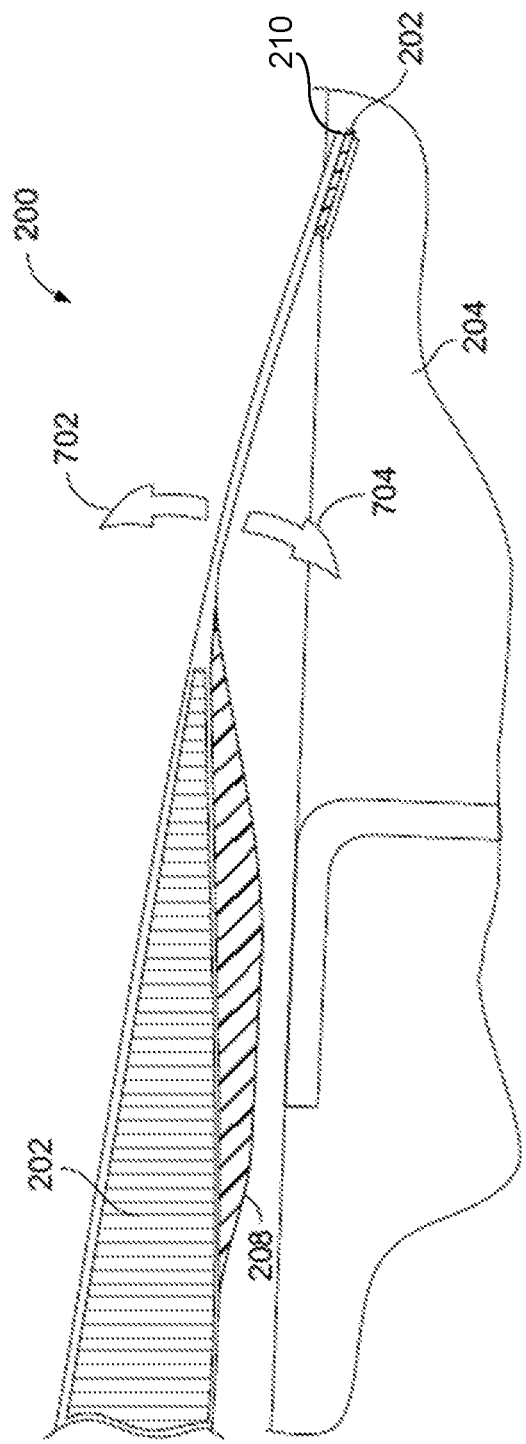

FIG. 7 illustrates the positioning tolerance between the spoiler 202 and the flap 204 when the spoiler 202 is rotated in a direction generally indicated by arrow 702. For example, if the spoiler 202 is rotated such that the rub block 208 disengages the flap 204, the trailing edge 210 may maintain sealing engagement with the flap 204. Alternatively, if the spoiler 202 is rotated in a direction generally indicated by arrow 704, the rub block 208 may engage the flap 204 and the trailing edge 210 may deflect and/or deform in the direction generally indicated by arrow 702 to enable the spoiler 202 to have a relatively aerodynamic shape (e.g., similar to FIG. 3).

Figure 8:
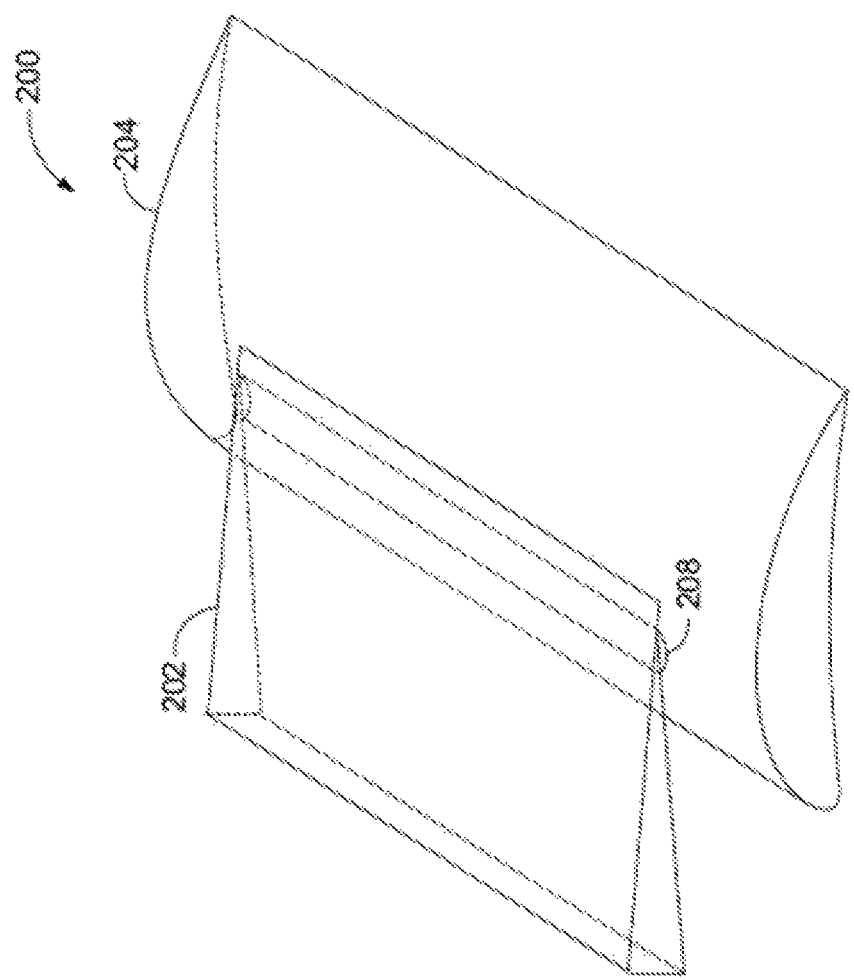
FIG. 8 depicts an isometric view of the example spoiler and the example flap that can be used to implement the example spoiler and the example flap of FIGS. 3-7.

FIG. 8 depicts an isometric view of the spoiler 202 and the flap 204. In the illustrated example, the rub block 208 is a single structure that spans substantially the entire spoiler 202. However, in other examples, the rub block 208 may include a plurality of spaced-apart pieces, a single piece that does not span the entire spoiler 202 and/or a plurality of closely spaced adjacent pieces.

Figure 9:
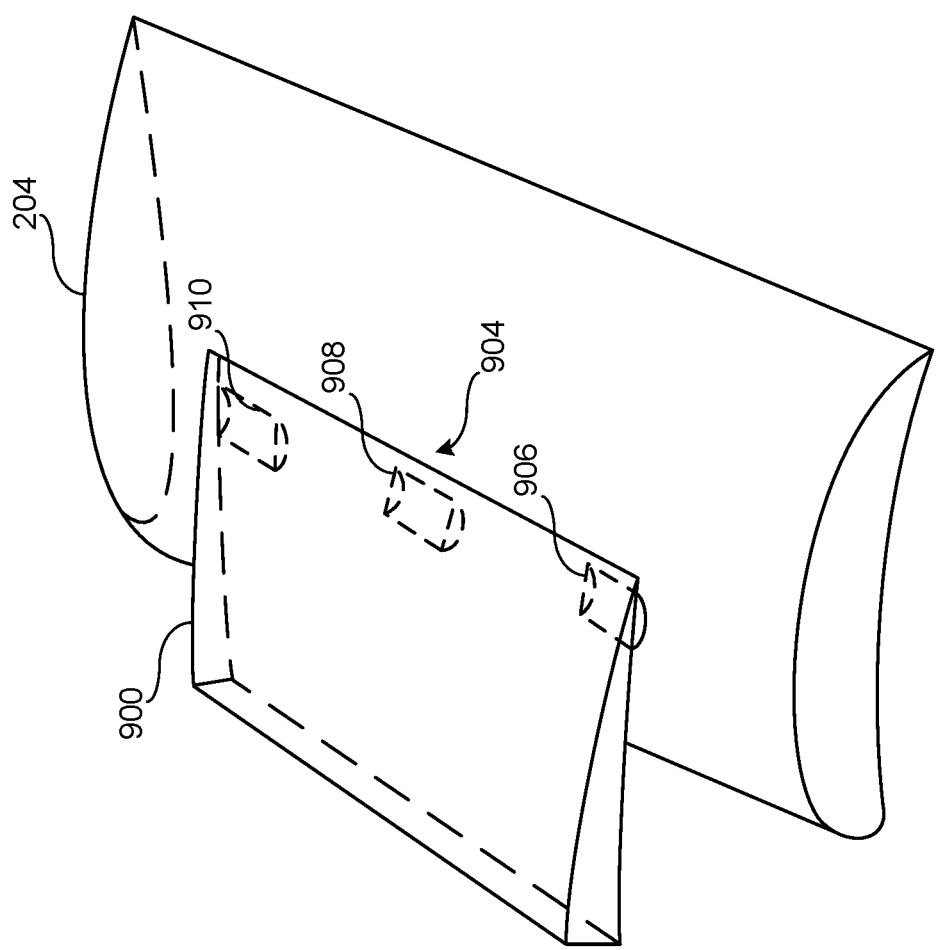
FIG. 9 depicts an isometric view of another example spoiler and an example flap that can be used to implement the examples disclosed herein.

FIG. 9 depicts an isometric view of an example spoiler 900 and the flap 204. In the illustrated example and in contrast to the example of spoiler 202 of FIG. 8, the spoiler 900 includes a rub block assembly 904 having a first rub block 906, a second rub block 908 and a third rub block 910. As shown in the example of FIG. 9, the rub blocks 906, 908, 910 are intermittently spaced along the entire spoiler 900. As such, the weight of the rub block assembly 904 may be less than the weight of the rub block 208 of FIG. 8. Further, the spacing of the rub blocks 906, 908, 910 enable air to flow between the rub blocks 906, 908, 910 to decrease the aerodynamic penalty contributed by the rub blocks 906, 908, 910 (e.g., flaps down aerodynamic penalties by impairing, changing and/or increasing a flap to spoiler gap(s)).

Figure 10:
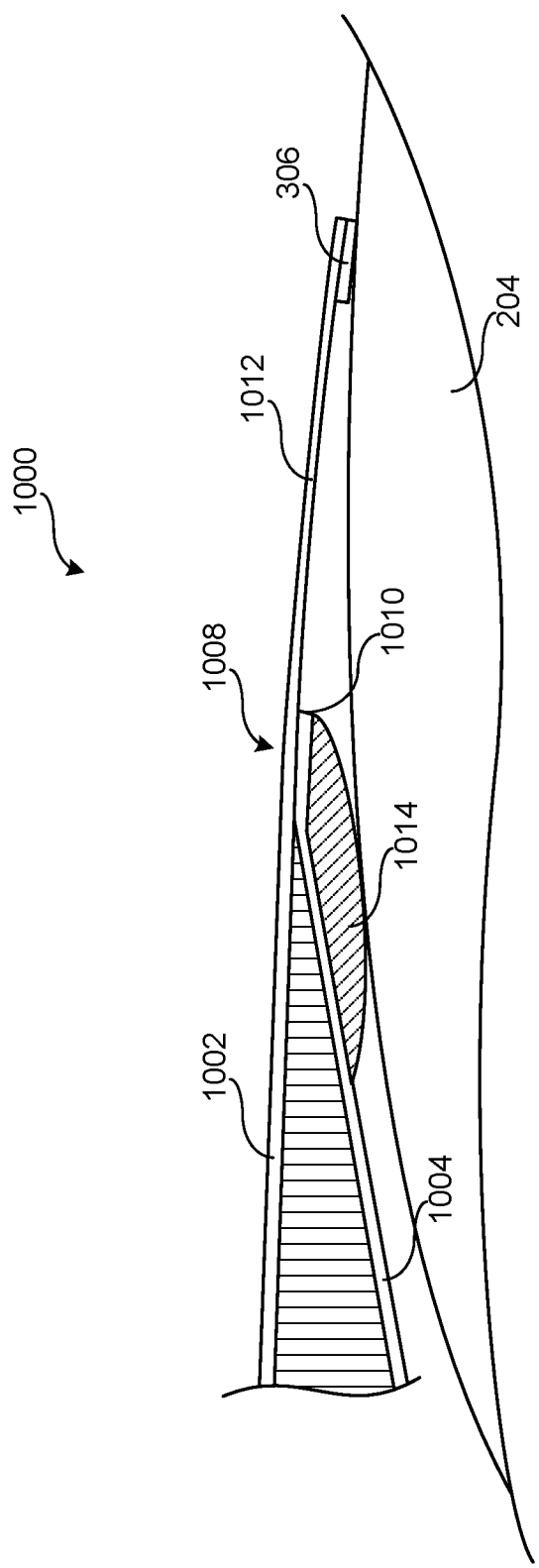
FIG. 10 depicts a cross-sectional view of an example spoiler having an example rub block that can be used to implement the examples disclosed herein.

FIG. 10 illustrates a cross-sectional view of an example spoiler 1000 that can be used to implement the spoilers disclosed herein. In the illustrated example, the spoiler 1000 includes an example first and/or upper panel 1002 and an example second and/or lower panel 1004 that are bonded at a coupling and/or joint 1008. In the example of FIG. 10, the upper panel 1002 extends past an end and/or bondline 1010 of the lower panel 1004 and forms a flexible tip 1012. To manage location tolerances of the spoiler 1000 and/or to manage flap to spoiler contact conditions during at least some backdrive events, the spoiler 1000 includes an example rub block 1014. In the illustrated example, the rub block 1014 ends at the bondline 1010 of the lower panel 1004. However, the rub block 1014 may be in any other location as demonstrated by some of the other examples disclosed herein.

Figure 11:
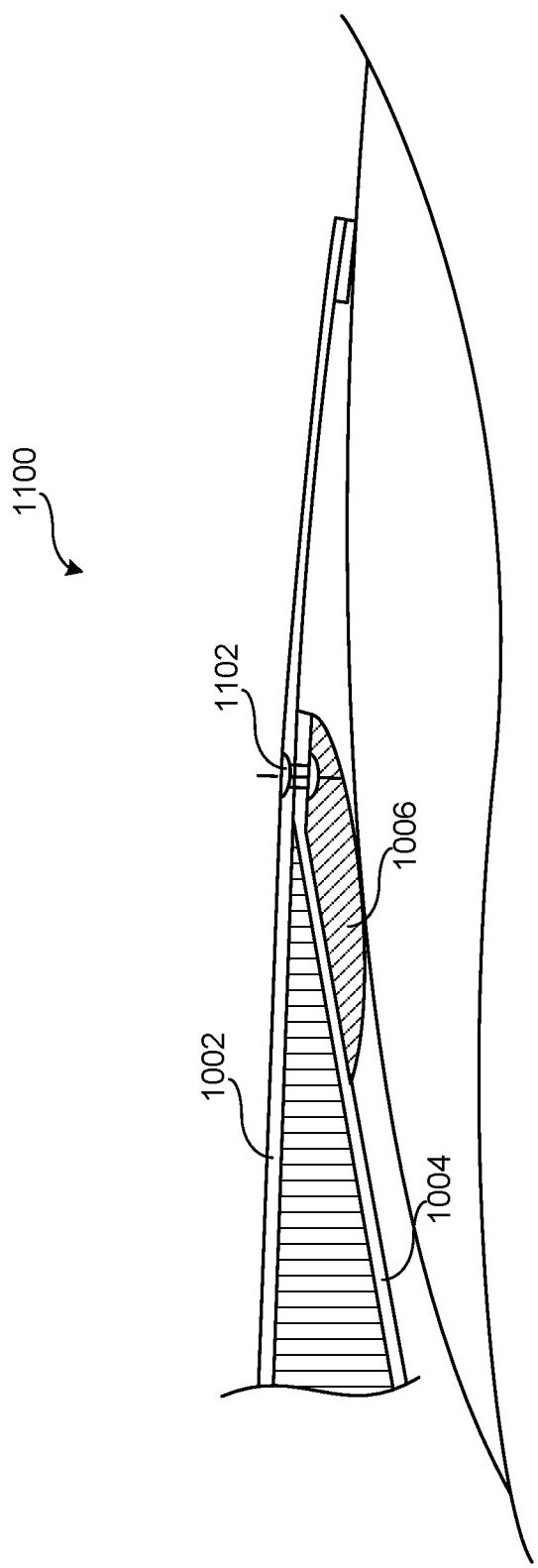
FIG. 11 depicts a cross-sectional view of another example spoiler having an example rub block and including panels that are coupled together using a fastener.

FIG. 11 illustrates a cross-sectional view of another example spoiler 1100 that can be used to implement the spoilers disclosed herein. The spoiler 1100 of FIG. 11 is similar to the spoiler 1000 of FIG. 10. However, in contrast to the spoiler 1000 of FIG. 10, the spoiler 1100 of FIG. 11 includes a fastener 1102 that extends through the upper and lower panels 1002, 1004. In the illustrated example, the fastener 1102 is countersunk into the upper panel 1002.

Figure 12:
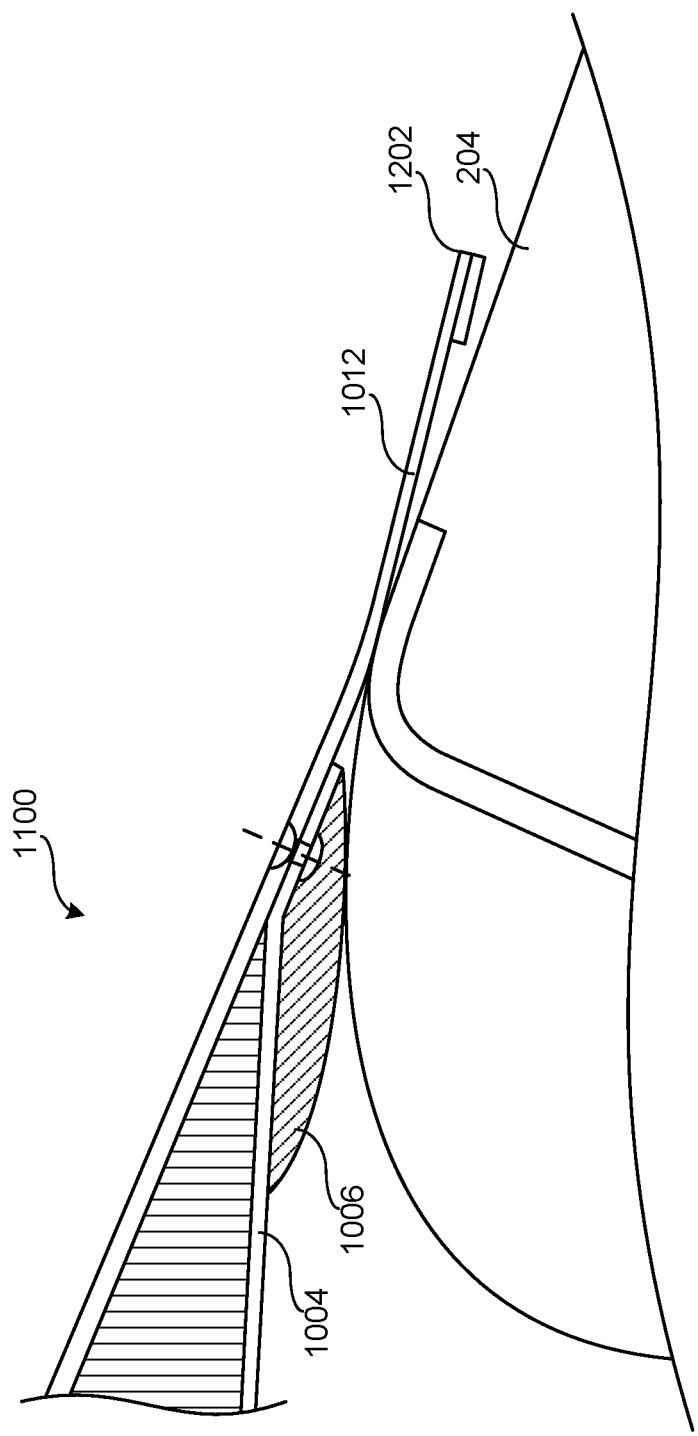
FIG. 12 depicts a cross-sectional view of the example spoiler of FIG. 11 engaging an example flap where the engagement between the rub block and the flap enables a flexible tip of the spoiler to deflect to achieve a desired profile.

FIG. 12 illustrates a failure condition in which the spoiler 1100 of FIG. 11 lowers into the flap 204 (e.g., spoiler hardover) and/or the flap 204 raises into and moves the spoiler 1100 (e.g., backdrive). In the illustrated example, the rub block 1006 engages the flap 204 to substantially ensure that a trailing edge 1202 of the spoiler 1100 is not damaged and/or for the flexible tip 1012 bends relative to the flap 204 to change. Additionally or alternatively, the engagement between the rub block 1006 and the flap 204 enables a desired contour of the flexible tip 1012 to be achieved, for example.

Figure 13:
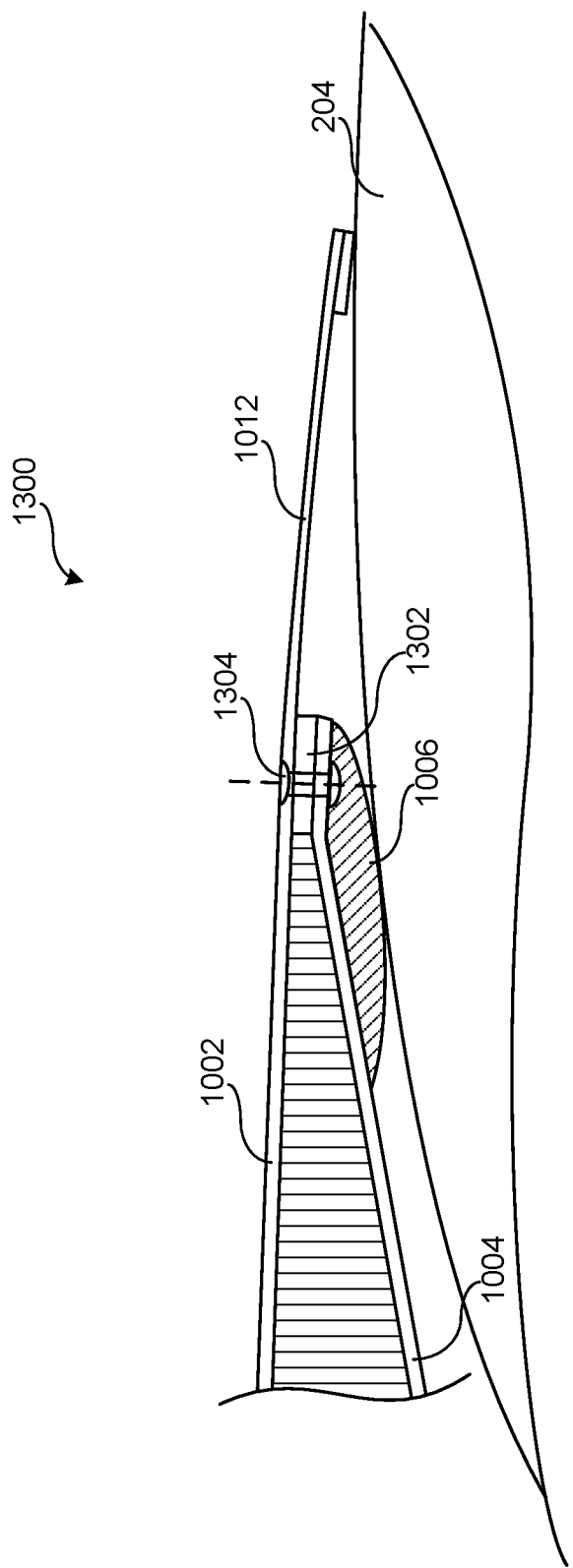
FIG. 13 depicts a cross-sectional view of an example spoiler having an example rub block and including a spacer disposed between panels of the spoiler.

FIG. 13 illustrates a cross-sectional view of another example spoiler 1300 that can be used to implement the spoilers disclosed herein. The spoiler 1300 of FIG. 13 is similar to the spoiler 1100 of FIG. 11. However, in contrast to the spoiler 1100 of FIG. 11, the spoiler 1300 of FIG. 13 includes a spacer 1302 positioned between the upper and lower panels 1002, 1004. As shown in the example of FIG. 13, a fastener 1304 extends through the upper panel 1002, the spacer 1302 and the lower panel 1004.

Figure 14:
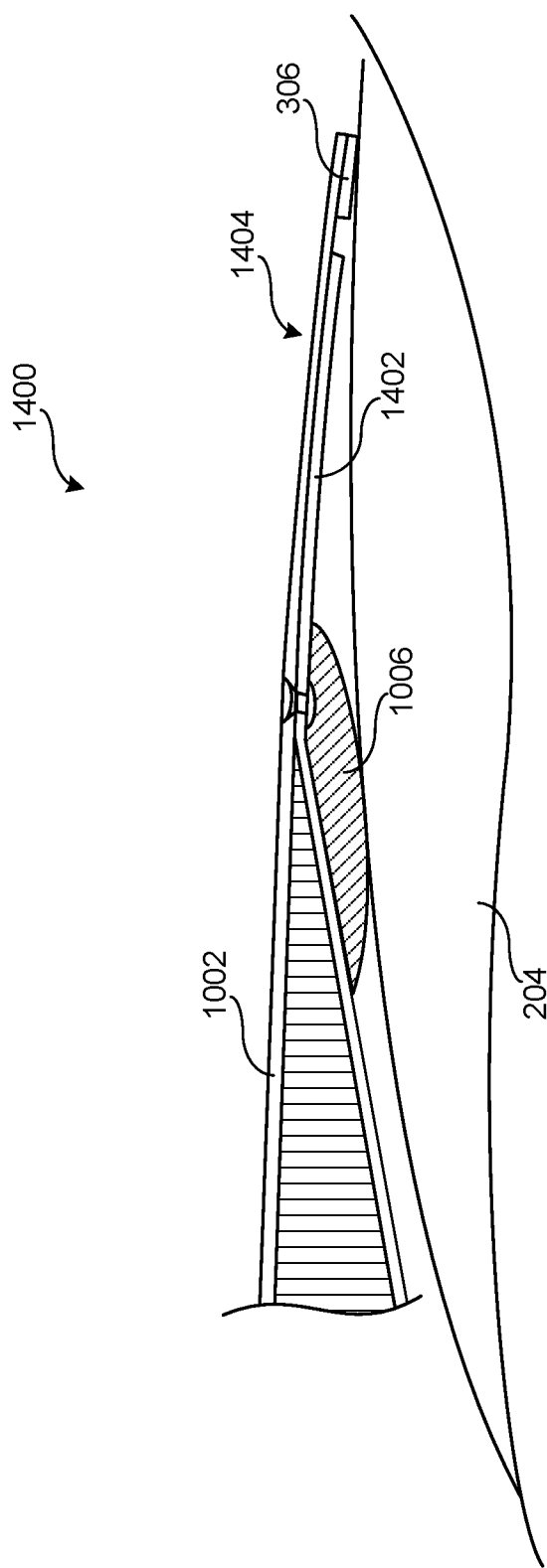
FIG. 14 depicts a cross-sectional view of an example spoiler having an example rub block and including a lower panel that extends aft of an example rub block.

FIG. 14 illustrates a cross-sectional view of another example spoiler 1400 that can be used to implement the spoilers disclosed herein. The spoiler 1400 of FIG. 14 is similar to the spoiler 1100 of FIG. 11. However, in contrast to the spoiler 1100 of FIG. 11, the spoiler 1400 of FIG. 14 includes a second and/or lower panel 1402 that extends past the rub block 1006 and ends and/or terminates adjacent the wear pads 306 of a flexible tip 1404 of the spoiler 1400. However, in other examples, the lower panel 1402 may be positioned in any location to change the flexibility of the flexible tip 1402. In some examples, the flexible tip 1402 is strong and/or stiff enough to not fail under maximum flight loads and/or strong and/or stiff enough to substantially not deflect under flight loads (e.g., 1 gravitational-force). In some examples, the flexible tip 1402 is flexible enough to enable the flexible tip 1402 to deflect out of the way under backdrive loads without being damaged (e.g., breaking, permanent deformation, etc.).

Figure 15:
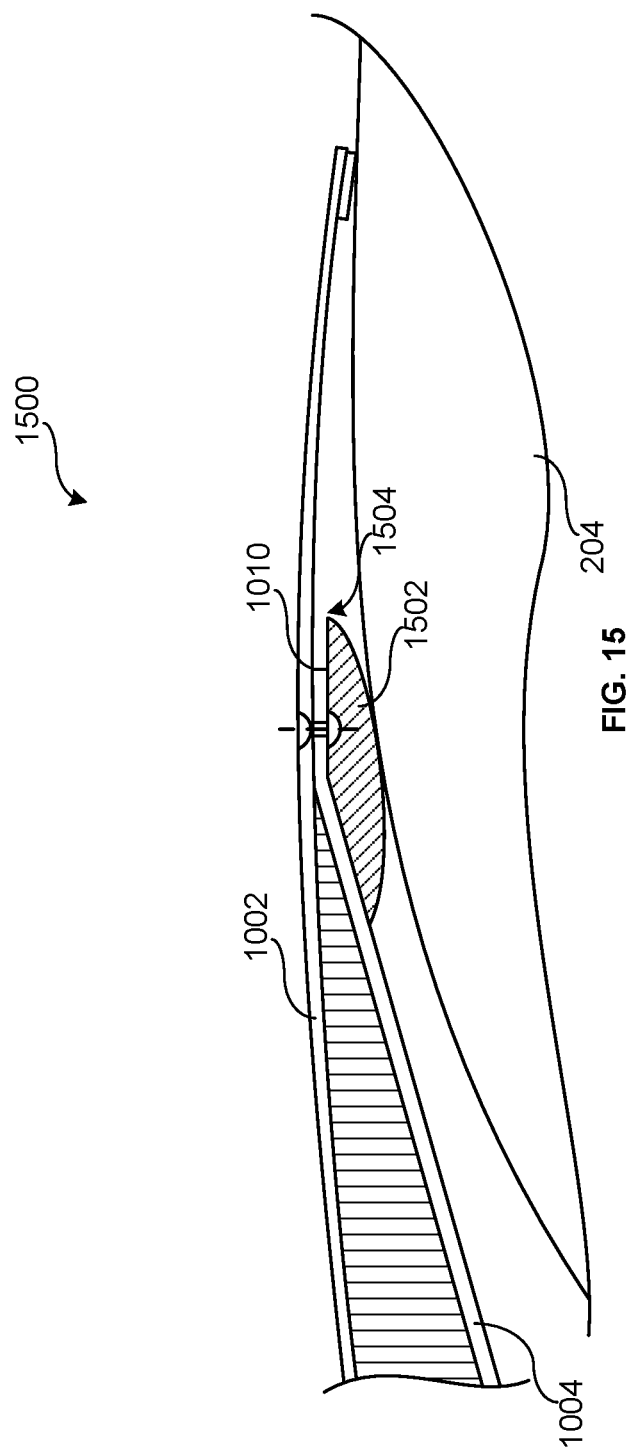
FIG. 15 depicts a cross-sectional view of an example spoiler having an example rub block that extends aft of a lower panel of the spoiler.

FIG. 15 illustrates a cross-sectional view of another example spoiler 1500 that can be used to implement the spoilers disclosed herein. The spoiler 1500 of FIG. 15 is similar to the spoiler 1100 of FIG. 11. However, in contrast to the spoiler 1100 of FIG. 11, the spoiler 1500 of FIG. 15 includes an example rub block 1502 that extends past the end 1010 of the lower panel 1004. Thus, in the illustrated example, a gap 1504 is formed between the rub block 1502 and the upper panel 1002.

Figure 16:
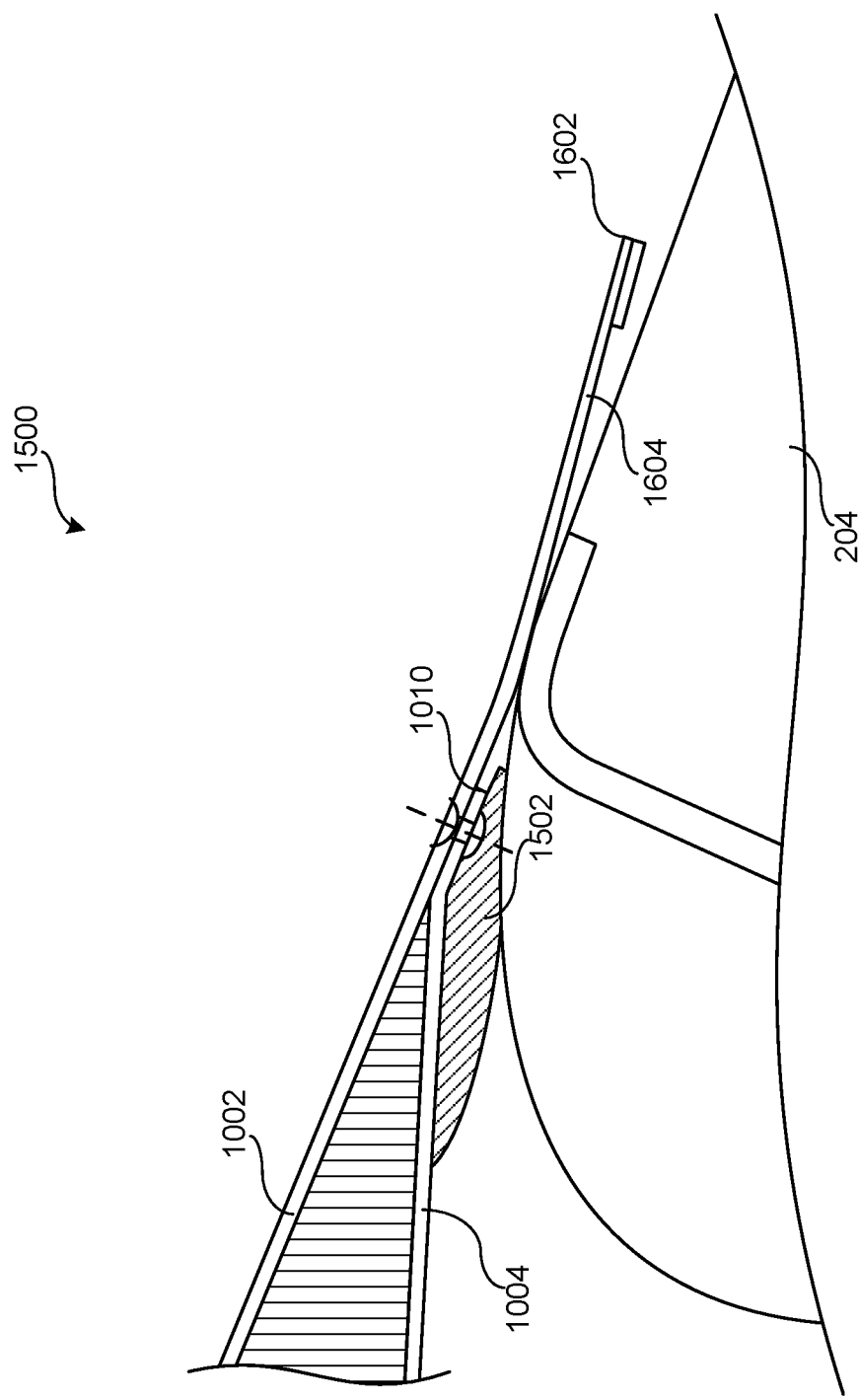
FIG. 16 depicts a cross-sectional view of the example spoiler of FIG. 15 engaging an example flap where the engagement between the rub block and the flap enables a flexible tip of the spoiler to deflect to achieve a desired profile.

FIG. 16 illustrates a failure condition in which the spoiler 1500 of FIG. 15 lowers into the flap 204 (e.g., spoiler hardover) and/or the flap 204 raises into and moves the spoiler 1500 (e.g., backdrive). In the illustrated example, the rub block 1502 engages the flap 204 to substantially ensure that a trailing edge 1602 is not damaged and/or for a flexible tip 1604 of the spoiler 1500 to bend relative to the flap 204. Additionally or alternatively, the engagement between the rub block 1502 and the flap 204 enables a desired contour of the flexible tip 1604 to be achieved, for example.

Figure 17:
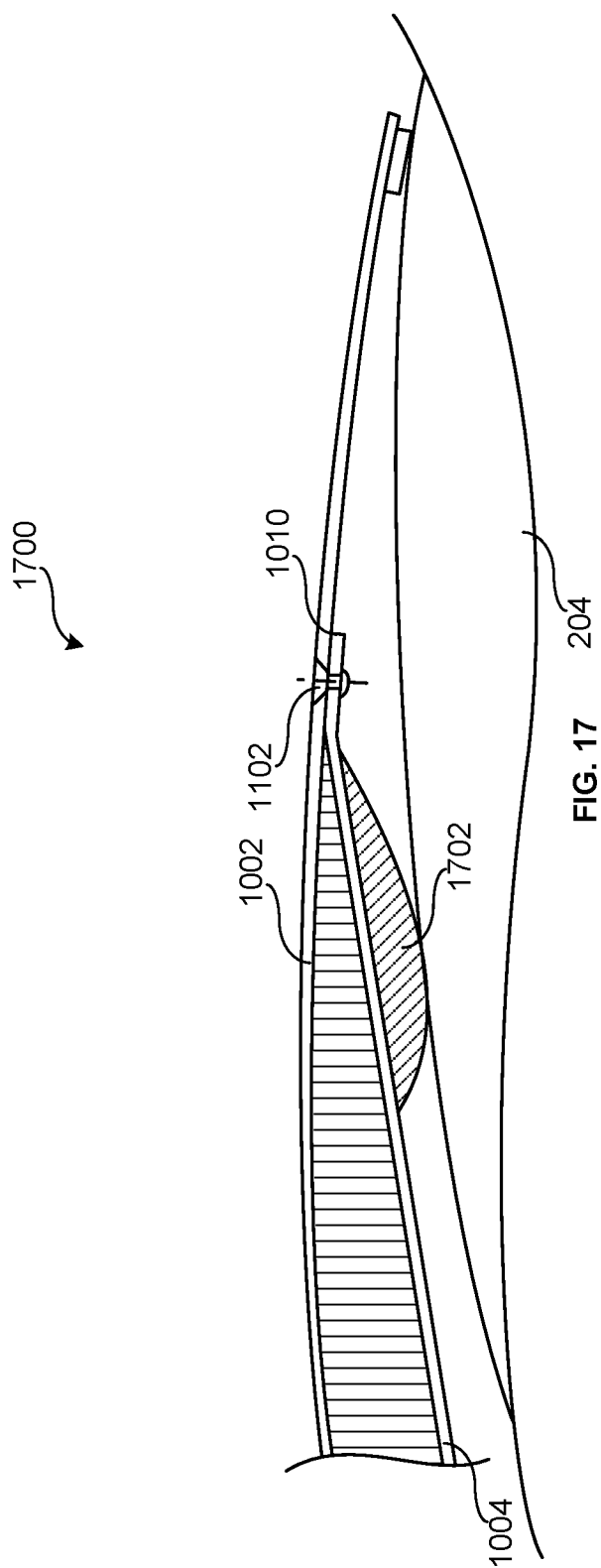
FIG. 17 depicts a cross-sectional view of an example spoiler having an example rub block that ends forward of a fastener coupling between first and second panels of the spoiler.

FIG. 17 illustrates a cross-sectional view of another example spoiler 1700 that can be used to implement the spoilers disclosed herein. The spoiler 1700 of FIG. 17 is similar to the spoiler 1100 of FIG. 11. However, in contrast to the spoiler 1100 of FIG. 11, the spoiler 1700 of FIG. 17 includes an example rub block 1702 that ends and/or terminates prior to the fastener 1102 and/or the end 1010 of the lower panel 1004.

Figure 18:
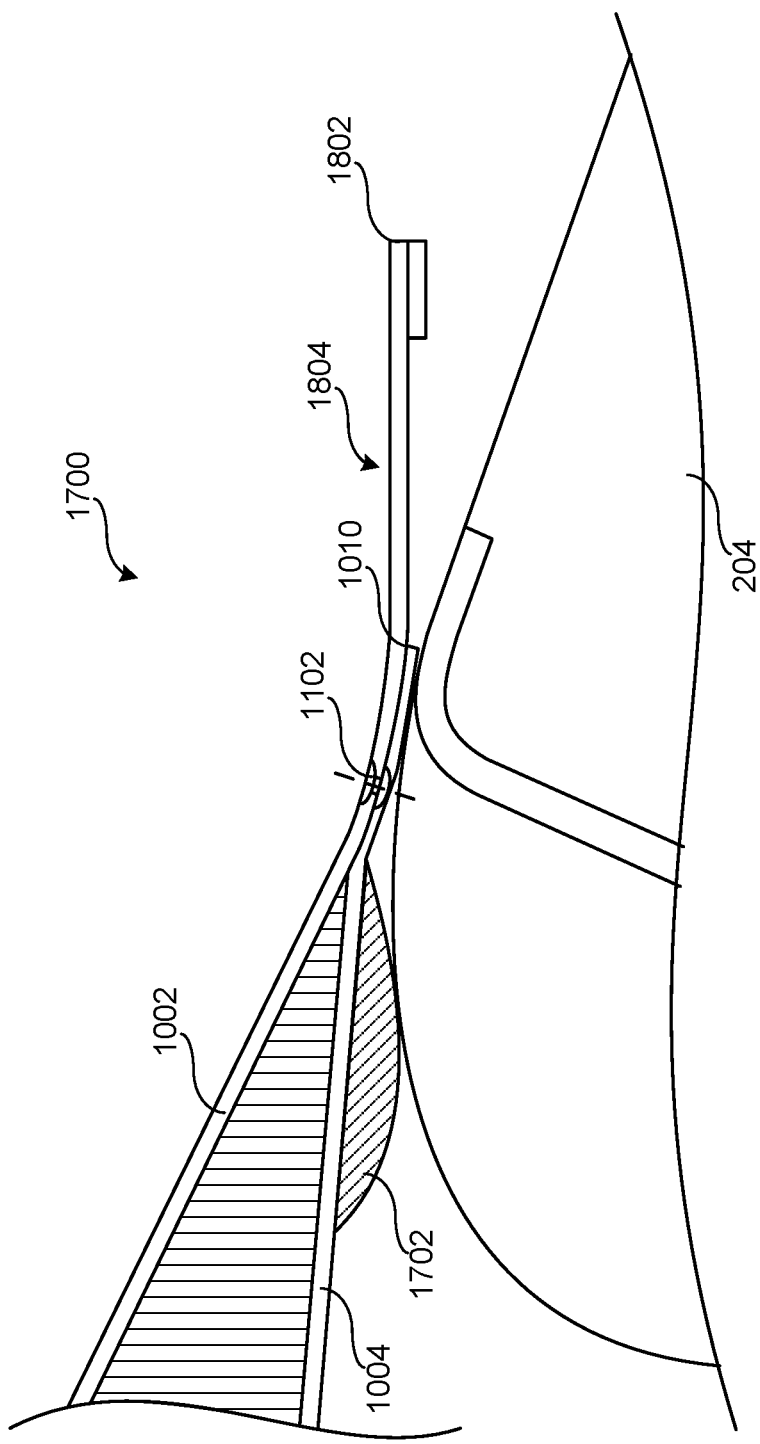
FIG. 18 depicts a cross-sectional view of the example spoiler of FIG. 17 engaging an example flap where the engagement between the rub block and the flap enables a flexible tip of the spoiler to deflect to achieve a desired profile.

FIG. 18 illustrates a failure condition in which the spoiler 1700 of FIG. 17 lowers into the flap 204 (e.g., spoiler hardover) and/or the flap 204 raises into and moves the spoiler 1700 (e.g., backdrive). In the illustrated example, the rub block 1702 engages the flap 204 to substantially ensure that a trailing edge 1802 of the spoiler 1700 is not damaged and/or for a flexible tip 1804 of the spoiler 1700 to bend relative to the flap 204 to change, etc. Additionally or alternatively, the engagement between the rub block 1702 and the flap 204 enables a desired contour of the flexible tip 1804 to be achieved, for example.

Figure 19:
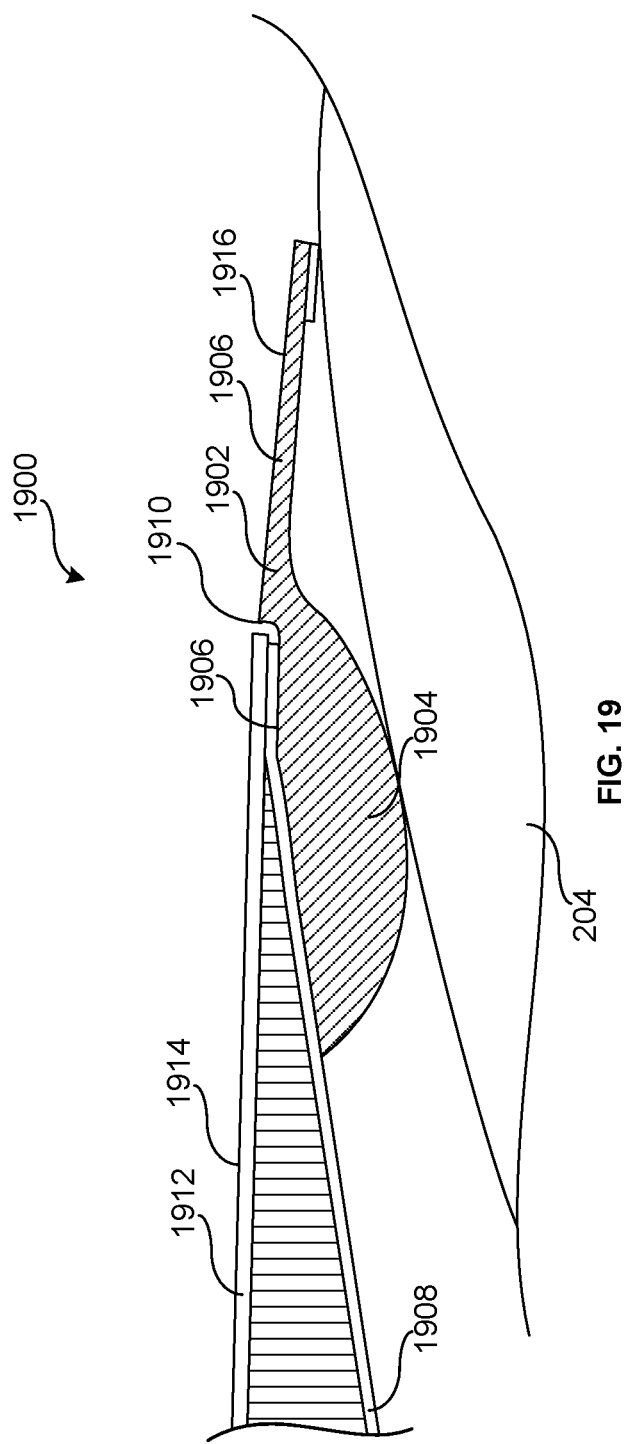
FIG. 19 depicts a cross-sectional view of an example spoiler coupled to an example rub block assembly including a rub block and a flexible tip, the rub block is structured to engage a flap and the flexible tip is structured to affect aerodynamic performance of the wing.

FIG. 19 illustrates a cross-sectional view of another example spoiler 1900 that can be used to implement the spoilers disclosed herein. In contrast to some of the other examples, the spoiler 1900 includes an example rub block assembly 1902 including a rub block and/or bulbous portion 1904 and an extension and/or flexible tip portion 1906. To enable the rub block assembly 1902 to be coupled to a second and/or lower panel 1908 of the spoiler 1900, in the illustrated example, the rub block assembly 1902 includes a groove 1910 that receives a first panel 1912 and/or the second panel 1908 of the spoiler 1900 to enable a first surface 1914 of the first panel 1912 to be substantially flush with a second surface 1916 of the flexible tip 1906. In the illustrated example, the first and second panels 1908, 1908 are bonded without the use of an additional fastener (e.g., a bolt, etc.). However, in other examples, the example spoiler 1900 includes a fastener(s) to couple the panels 1908, 1912 together.

Figure 20:
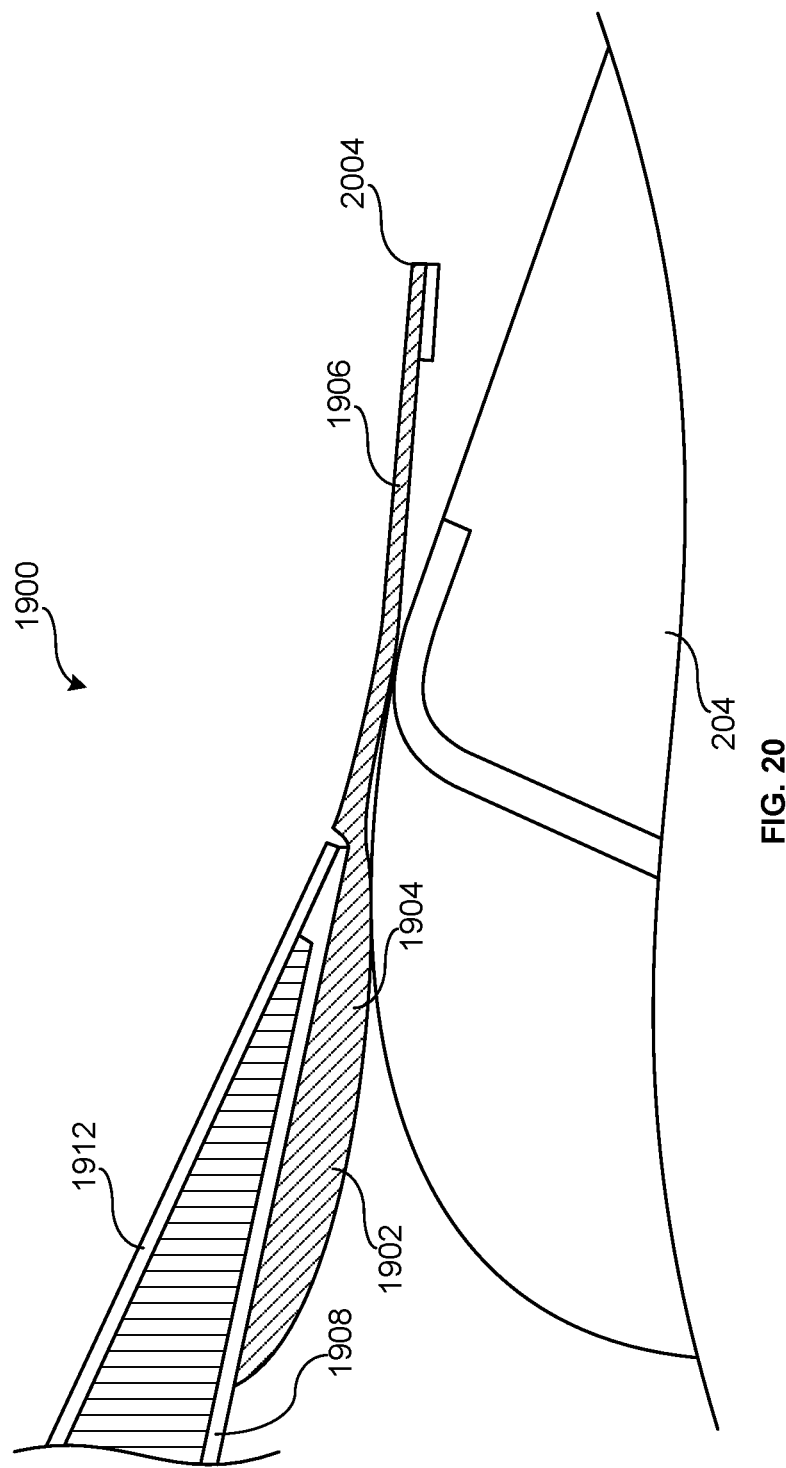
FIG. 20 depicts a cross-sectional view of the example spoiler of FIG. 19 engaging an example flap where the engagement between the rub block of the rub block assembly and the flap enables a flexible tip of the rub block assembly to deflect to achieve a desired profile.

FIG. 20 illustrates a failure condition in which the spoiler 1900 of FIG. 19 lowers into the flap 204 (e.g., spoiler hardover) and/or the flap 204 raises into and moves the spoiler 1900 (e.g., backdrive). In the illustrated example, the rub block 1904 of the rub block assembly 1902 engages the flap 204 to substantially ensure that a trailing edge 2004 of the spoiler 1900 is not damaged and/or for the flexible tip 1906 to bend relative to the flap 204 to change, etc. Additionally or alternatively, the engagement between the rub block 1908 and the flap 204 enables a desired contour of the flexible tip 1906 to be achieved, for example.

Figure 21:
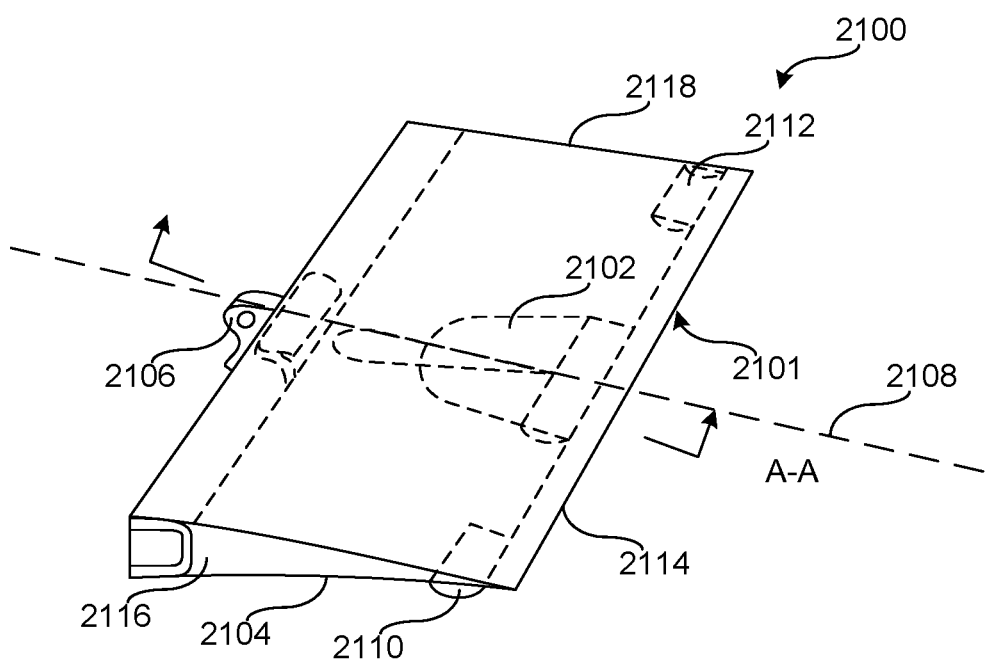
FIG. 21 depicts an isometric view of an example spoiler including an example rub block assembly.

FIG. 21 illustrates a cross-sectional view of another example spoiler 2100 that can be used to implement the spoilers disclosed herein. In the illustrated example, to mitigate increased contact loads at a contact point and/or area between the spoiler 2100 and a flap, the spoiler 2100 include an example rub block assembly 2101 including an example first rub block 2102 that extends along a lower surface 2104 of the spoiler 2100 toward a hinge 2106 of the spoiler 2100. In some examples, the hinge 1206 enables the spoiler 2100 to move and/or rotate to different positions. Because the flap to spoiler 2100 contact loads of the spoiler 2100 may be concentrated along a center axis 2108 of an actuator of the spoiler 2100, in some examples, the example first rub block 2102 extends to an aft region of the hinge 2106. In other words, in some examples, the first rub block 2102 is extended forward from a trailing edge 2114 of the spoiler 2100 in regions where contact between the spoiler 2100 and the flap may occur. In some examples, the actuator used to actuate the spoiler 2100 positioned toward the middle of the spoiler 2100 (e.g., centrally located spanwise on the spoiler 2100). In other examples, the actuator used to actuate the spoiler 2100 is off-set relative to a central axis of the spoiler 2100. In this example, the rub block assembly 2201 includes the first rub block 2102, an example second rub block 2110 and an example third rub block 2112. In some examples, the first rub block 2102 is larger and/or differently shaped than the second and/or third rub blocks 2110, 2112 that are disposed adjacent sides 2116, 2118 of the spoiler 2100.

Figure 22:
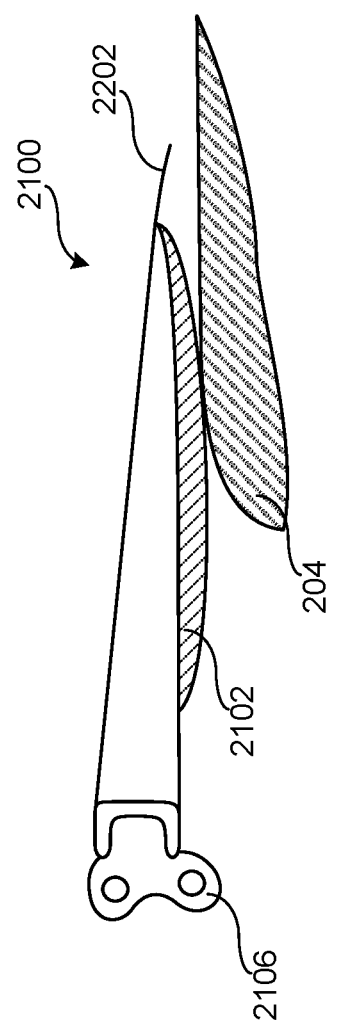
FIG. 22 depicts a cross-sectional view of the spoiler of FIG. 21 taken along line A-A.

FIG. 22 illustrates a cross-sectional view of the spoiler 2100 engaging the flap 204 taken along A-A of FIG. 21. As shown in the illustrated example, the first rub block 2102 extends toward the hinge 2106 from a flexible tip 2202 of the spoiler 2100.

Figure 23:
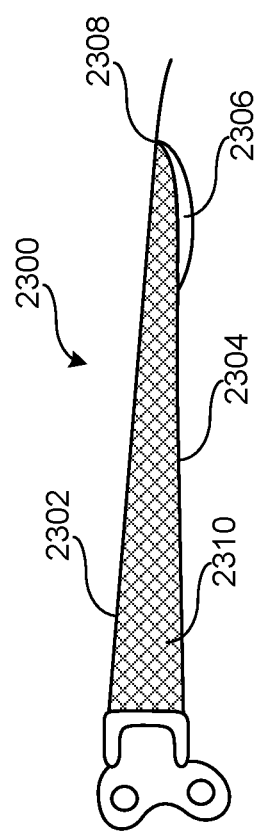
FIG. 23 depicts a cross-sectional view of an example spoiler including panels that are coupled to capture a relatively high-density internal structure therebetween.

FIG. 23 illustrates a cross-sectional view of another example spoiler 2300 that can be used to implement the spoilers disclosed herein. In the illustrated example, the spoiler 2300 includes a first and/or upper panel 2302, a second and/or lower panel 2304 and a rub block 2306 coupled to the lower panel 2304. As shown in the example of FIG. 23, the rub block 2306 does not extend past a bondline 2308 formed at a coupling between the upper and lower panels 2302, 2304. In the illustrated example, to enable higher local compression loads to be reacted through the spoiler 2300, the spoiler 2300 includes a relatively high-density core 2310. The high-density core 2310 may include a honeycomb structure.

Figure 24:
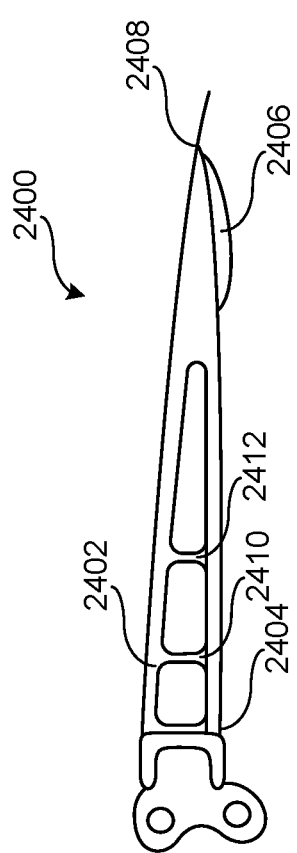
FIG. 24 depicts a cross-sectional view of an example spoiler including panels between which example ribs extend.

FIG. 24 illustrates a cross-sectional view of another example spoiler 2400 that can be used to implement the spoilers disclosed herein. In the illustrated example, the spoiler 2400 includes a first and/or upper panel 2402, a second and/or lower panel 2404 and a rub block 2406 coupled to the lower panel 2404. As shown in the example of FIG. 24, the rub block 2406 does not extend past a bondline 2408 formed at a coupling between the upper and lower panels 2402, 2404. In the illustrated example, to enable higher local compression loads to be reacted through the spoiler 2300, the spoiler 2300 includes example ribs 2410, 2412 that extend between the upper and lower panels 2402, 2404. While the example of FIG. 24 includes two ribs, any number of ribs may be provided that enhance the structural stability of the example spoiler 2400.

The examples disclosed herein improve the performance of a spoiler by enabling the spoiler to contact a flap at a point along a lower surface of the spoiler, thereby improving the aerodynamics of the wing and minimizing the gap between the flap leading edge and the spoiler trailing edge in the flap retracted configuration. The examples disclosed herein enable the spoiler to be directed and/or positioned in a particular position while also minimizing a load applied by the flap to the spoiler trailing edge. In some examples, the lower surface of the spoiler is a lower surface forward of the spoiler trailing edge. To improve the performance of and/or reduce the wear of the spoiler, shims and/or rub strips may be installed, integrated into and/or coupled on the lower surface of the spoiler forward of the spoiler trailing edge.

As set forth herein, an example apparatus includes a body having a trailing edge and a leading edge. The leading edge is to be coupled to an aircraft wing. The trailing edge is to engage a flap of an aircraft wing. The body includes a structure located between the trailing edge and the leading edge. The structure is to engage the flap to maintain a distance between the body and the flap In some examples, the body includes a spoiler. In some examples, the structure includes a rub block. In some examples, the structure is to span substantially the entire body. In some examples, the apparatus is to be used with an aircraft comprising trailing edge variable camber operation. In some examples, the structure is to enable a relatively low contact force seal between the trailing edge and the flap. In some examples, an interaction between the body and the flap is to substantially ensure relatively smooth airflow over the aircraft wing.

In some examples, an interaction between the trailing edge and the flap is to deform the trailing edge to a relatively aerodynamic shape. In some examples, the apparatus includes one or more wear strips coupled adjacent the trailing edge. The one or more wear strips are to engage the flap. In some examples, the structure comprises a shape to enable relatively smooth airflow between the body and the flap. In some examples, the structure includes a contour to enable the flap to engage and move the body, via the structure, in a failure condition. In some examples, the structure is to maintain the distance between the body and the flap in a cruise configuration.

Another example includes a spoiler for use with an aircraft and a flap for use with the aircraft. A trailing edge of the spoiler to engage the flap. The apparatus includes means for maintaining a gap between the spoiler and the flap. In some examples, the means for maintaining the gap includes a structure located between the trailing edge and a leading edge of the spoiler. The structure is to engage the flap. In some examples, the structure is to span substantially the entire spoiler. In some examples, the structure is to enable a relatively low contact force seal between the trailing edge and the flap. In some examples, the structure includes a shape to enable relatively smooth airflow between the body and the flap. In some examples, the apparatus is to be used with an aircraft comprising trailing edge variable camber operation.

An example method includes directing a spoiler of an aircraft to a location and enabling the spoiler to engage a flap at a distance from a trailing edge of the spoiler to minimize and/or be capable of reacting to a load applied to the trailing edge of the spoiler. In some examples, the method includes providing a structure at a distance from the trailing edge to maintain a distance between the spoiler and the flap.

An example apparatus, comprising: a spoiler including: a leading edge, the leading edge to be coupled to an aircraft wing, a variable camber trailing edge; and a structure located between the variable camber trailing edge and the leading edge, when the spoiler is coupled to the aircraft wing and the spoiler is positioned adjacent a flap, a space free of other structures is defined by the flap, the variable camber trailing edge, the structure, and an end of the variable camber trailing edge to enable trailing edge variable camber operation of the variable camber trailing edge, when the structure engages a first portion of the flap, the structure maintains a distance between the spoiler and the flap to enable the variable camber trailing edge to engage a second portion of the flap, the engagement between the variable camber trailing edge and the second portion of the flap to plastically deform the variable camber trailing edge to change a camber of the aircraft wing to which the spoiler is to be coupled, the engagement between the structure and the flap to enable a reduced contact force seal between the variable camber trailing edge and the second portion.

An example apparatus includes a spoiler including: a trailing edge; a leading edge, the leading edge to be coupled to an aircraft wing, the spoiler having a tapered portion and a flexible tip, the tapered portion including the leading edge, the flexible tip including the trailing edge, the trailing edge to engage a flap of the aircraft wing; and a structure located between the trailing edge and the leading edge, when the structure engages a first portion of the flap, the structure maintains a distance between the spoiler and the flap to enable the trailing edge to engage a second portion of the flap, the structure ending adjacent an intersection between the tapered portion and the flexible tip to enable the engagement between the trailing edge and the second portion to elastically deform the trailing edge to change a camber of the aircraft wing, the engagement between the structure and the flap to enable a reduced contact force seal between the trailing edge and the second portion.

In some examples, the structure is a rub block. In some examples, the structure is to span substantially a majority of the spoiler. In some examples, an interaction between the spoiler and the flap is to enable smoother airflow over the aircraft wing. In some examples, the apparatus includes one or more wear strips coupled adjacent the trailing edge, the one or more wear strips to engage the flap, the one or more wear strips spaced from the structure. In some examples, the structure includes a shape to enable smoother airflow between the spoiler and the flap. In some examples, the structure includes a contour to enable the flap to engage and move the spoiler, via the structure, in a failure condition without plastically deforming the spoiler. In some examples, the structure is to maintain the distance between the spoiler and the flap in a cruise configuration. In some examples, the spoiler is a drooping spoiler.

In some examples, the structure includes a first surface, a second surface, and a third surface, the first surface being closest to the leading edge, the third surface being closest to the trailing edge, the second surface disposed between the first surface and the third surface, the first, second, and third surfaces being out of coplanar alignment, the second surface to engage the flap in a first position of the flap or the spoiler, the third surface to engage the flap in a second position of the flap or the spoiler. In some examples, the structure is a solid structure. In some examples, the structure is coupled to an underside of the spoiler, the spoiler extending to the trailing edge, the spoiler being different than the structure, a wear pad being coupled to the spoiler at the trailing edge, the wear pad being spaced from the structure.

In some examples, the flexible tip is sized to enable the flexible tip to flex when the trailing edge engages the second portion of the flap. In some examples, the flexible tip includes four plies. In some examples, the flexible tip extends past the tapered portion to the trailing edge, the structure attached to an underside of the spoiler such that an end of the structure is at an end of the tapered portion.

An example apparatus includes a spoiler for use with an aircraft, the spoiler including a tapered portion and a flexible tip, the tapered portion including a leading edge, the flexible tip including a trailing edge; a flap for use with the aircraft, the trailing edge of the spoiler to engage the flap; and means for maintaining a gap between the spoiler and the flap, when the means for maintaining the gap engages a first portion of the flap, the means for maintaining the gap enables the trailing edge to engage a second portion of the flap, the means for maintaining the gap ending adjacent an intersection between the tapered portion and the flexible tip to enable the engagement between the trailing edge and the second portion to elastically deform the trailing edge to change a camber of a wing of the aircraft, the means for maintaining the gap to enable a reduced contact force seal between the trailing edge and the flap.

In some examples, the means for maintaining the gap includes a structure located between the trailing edge and the leading edge of the spoiler, the structure to engage the flap, the structure being coupled to an underside of the spoiler, the structure to engage the first portion of the flap to maintain a distance between the spoiler and the flap, the trailing edge to engage the second portion of the flap, the engagement between the structure and the flap to enable the reduced contact force seal between the trailing edge and the second portion. In some examples, the structure is to span substantially a majority of the spoiler. In some examples, the structure includes a shape to enable smoother airflow between the spoiler and the flap.

An example method includes directing a spoiler of an aircraft to a location, the spoiler including a tapered portion and a flexible tip, the tapered portion including a leading edge, the flexible tip including a trailing edge; enabling a first surface of a structure on an underside of the spoiler to engage a first portion of a flap in a first position of the spoiler or the flap, the structure spaced from the trailing edge of the spoiler; and enabling a second surface of the structure to engage the first portion of the flap in a second position of the spoiler or the flap, the first position associated with a normal operation of the aircraft or a cruise position, the second position associated with spoiler hardover, a failure condition, or flap backdrive, when the structure engages the first portion of the flap, the structure maintains a distance between the spoiler and the flap to enable the trailing edge of the spoiler to engage a second portion of the flap, the structure ending adjacent an intersection between the tapered portion and the flexible tip to enable the engagement between the trailing edge and the second portion to elastically deform the trailing edge to change a camber of an aircraft wing, the engagement between the structure and the flap to minimize a load applied to the trailing edge of the spoiler.

An example apparatus includes a spoiler including a first panel and a second panel, a flexible tip extending from an intersection of the first and second panels; and a rub block coupled to a surface of the second panel, the rub block positioned to engage a flap to maintain a distance between the spoiler and the flap and to enable the flexible tip to perform a variable camber operation in which the flexible tip deforms to change aerodynamic properties of the spoiler.

In some examples, the rub block includes a first rub block, a second rub block, a third rub block, the first rub block coupled adjacent a first side of the spoiler, the second rub block coupled adjacent a second side of the spoiler opposite the first side, the third rub block centrally and/or otherwise coupled to the spoiler, the first, second, and third rub blocks being spaced to enable airflow between the first rub block and the second rub block and to enable airflow between the second rub block and the third rub block.

In some examples, the spoiler includes a hinge adjacent a leading edge of the spoiler, the flexible tip including a trailing edge of the spoiler, the rub block positioned between the hinge and the trailing edge. In some examples, the third rub block extends a greater distance toward the hinge than the first and second rub blocks to provide a larger contact area between the third rub block and the flap. In some examples, the first and second panels include metal. In some examples, the apparatus includes a fastener extending through the first and second panels at the intersection to couple the first and second panels. In some examples, the apparatus includes a spacer coupled between the first and second panels at the intersection between the first and second panels.

In some examples, the flexible tip includes the first panel and the second panel, the rub block ending forward of a bondline between the first and second panels. In some examples, the rub block ends forward of a bondline between the first and second panels. In some examples, the rub block ends aft of a bondline between the first and second panels. In some examples, the apparatus includes a rub block assembly including the rub block and the flexible tip. In some examples, the rub block assembly include a recess to receive at least one of the first panel or the second panel to couple the rub block assembly to the second panel. In some examples, the rub block includes a bulbous portion structured to engage the flap. In some examples, the spoiler includes an internal structure to react compressional loads. In some examples, the internal structure includes a high-density core. In some examples, the internal structure includes a honeycomb structure. In some examples, the internal structure includes at least one rib that extends between the first panel and the second panel.

An example apparatus includes a spoiler including a first panel and a second panel, a flexible tip extending from an intersection of the first and second panels; a flap; and means for enabling a configuration between the spoiler and the flap that reduces an area of a wing of an aircraft. In other words, the means for enabling the configuration enables a higher fowler configuration that would not otherwise be achievable, for example. In some examples, the means for enabling a configuration includes a rub block centrally disposed and coupled to the second panel of the spoiler, the rub block being spaced from first and second lateral sides of the spoiler to reduce an aerodynamic penalty contributed by the rub block, the rub block structured to react a contact load between the spoiler and the flap when the spoiler and the flap engage.

In some examples, the rub block includes a first rub block, wherein the means for enabling a configuration includes a second rub block and a third rub block, the second rub block coupled to the second panel adjacent the first lateral side, the third rub block coupled to the second panel adjacent the second lateral side, the spoiler includes a hinge adjacent a leading edge of the spoiler to enable the spoiler to be coupled to the wing, the first rub block extending closer to the hinge than the second rub block and the third rub block, the first rub block spaced from the second rub block, the first rub block spaced from the third rub block.

An example apparatus, comprising a spoiler including a first panel and a second panel, a flexible tip extending from an intersection of the first and second panels; a flap; and means for contacting the flap when the spoiler overlaps the flap to manage a position of the spoiler relative to the flap. In some examples, the means for contacting the flap includes a rub block centrally disposed and coupled to the second panel of the spoiler, the rub block being spaced from first and second lateral sides of the spoiler to reduce an aerodynamic penalty contributed by the rub block, the rub block structured to react a contact load between the spoiler and the flap when the spoiler and the flap engage. In some examples, the rub block includes a first rub block, wherein the means for contacting the flap includes a second rub block and a third rub block, the second rub block coupled to the second panel adjacent the first lateral side, the third rub block coupled to the second panel adjacent the second lateral side, the spoiler includes a hinge adjacent a leading edge of the spoiler to enable the spoiler to be coupled to the wing, the first rub block extending closer to the hinge than the second rub block and the third rub block, the first rub block spaced from the second rub block, the first rub block spaced from the third rub block.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
    a spoiler including a first panel and a second panel, a flexible tip extending from an intersection of the first and second panels; and
    a rub block coupled to a surface of the second panel, the flexible tip extending beyond the rub block, the rub block positioned to engage a flap to maintain a distance between the spoiler and the flap and to enable the flexible tip to deform to change aerodynamic properties of the spoiler.

2. The apparatus of claim 1, wherein the rub block is a first rub block, and further comprising a second rub block and a third rub block, the first rub block coupled adjacent a first side of the spoiler, the second rub block coupled adjacent a second side of the spoiler opposite the first side, the third rub block coupled to the spoiler, the first, second, and third rub blocks being spaced to enable airflow between the first rub block and the second rub block and to enable airflow between the second rub block and the third rub block.

3. The apparatus of claim 2, wherein the spoiler includes a hinge adjacent a leading edge of the spoiler, the flexible tip including a trailing edge of the spoiler, the rub blocks positioned between the hinge and the trailing edge.

4. The apparatus of claim 3, wherein the third rub block extends a greater distance toward the hinge than the first and second rub blocks to provide a larger contact area between the third rub block and the flap.

5. The apparatus of claim 1, wherein the first and second panels include metal.

6. The apparatus of claim 1, further including a fastener extending through the first and second panels at the intersection to couple the first and second panels.

7. The apparatus of claim 6, further including a spacer coupled between the first and second panels at the intersection between the first and second panels.

8. The apparatus of claim 1, wherein the flexible tip includes the first panel and the second panel, the rub block ending forward of a bondline between the first and second panels.

9. The apparatus of claim 1, wherein the rub block ends forward of a bondline between the first and second panels.

10. The apparatus of claim 1, wherein the rub block ends aft of a bondline between the first and second panels.

11. The apparatus of claim 1, further including a rub block assembly including the rub block and the flexible tip.

12. The apparatus of claim 11, wherein the rub block assembly includes a recess to receive at least one of the first panel or the second panel to couple the rub block assembly to the second panel.

13. The apparatus of claim 11, wherein the rub block includes a bulbous portion structured to engage the flap.

14. The apparatus of claim 1, wherein the spoiler includes an internal structure to react compressional loads.

15. The apparatus of claim 14, wherein the internal structure includes a high-density core.

16. The apparatus of claim 14, wherein the internal structure includes a honeycomb structure.

17. The apparatus of claim 14, wherein the internal structure includes at least one rib that extends between the first panel and the second panel.

18. An apparatus, comprising:
    a spoiler including a first panel and a second panel, a flexible tip extending from an intersection of the first and second panels;
    a flap; and
    means for contacting the flap when the spoiler overlaps the flap to manage a position of the spoiler relative to the flap, the flexible tip extending beyond the means for contacting the flap.

19. The apparatus of claim 18, wherein the means for contacting the flap includes a rub block centrally disposed and coupled to the second panel of the spoiler, the rub block being spaced from first and second lateral sides of the spoiler to reduce an aerodynamic penalty contributed by the rub block, the rub block structured to react a contact load between the spoiler and the flap when the spoiler and the flap engage.

20. The apparatus of claim 19, wherein the rub block includes a first rub block, wherein the means for contacting the flap includes a second rub block and a third rub block, the second rub block coupled to the second panel adjacent the first lateral side, the third rub block coupled to the second panel adjacent the second lateral side, the spoiler includes a hinge adjacent a leading edge of the spoiler to enable the spoiler to be coupled to a wing, the first rub block extending closer to the hinge than the second rub block and the third rub block, the first rub block spaced from the second rub block, the first rub block spaced from the third rub block.

* * * * *